United States Patent [19]

Tu

[11] Patent Number: 5,381,231
[45] Date of Patent: Jan. 10, 1995

[54] ONE-PIECE SILICON SUBSTRATE HAVING FIBER OPTIC STOPS AND A REFLECTIVE SURFACE THEREON AND METHODS OF MANUFACTURING SAME

[75] Inventor: Xiang-Zheng Tu, Piscataway, N.J.

[73] Assignee: Ameron Technologies, Inc., Bound Brook, N.J.

[21] Appl. No.: 1,541

[22] Filed: Jan. 7, 1993

[51] Int. Cl.⁶ ............................................. G01B 9/02
[52] U.S. Cl. ............................... 356/352; 356/345
[58] Field of Search ............ 356/352, 345; 385/12, 385/14; 250/227.19, 227.27, 231.19

[56] References Cited

U.S. PATENT DOCUMENTS

| | | | |
|---|---|---|---|
| 4,475,790 | 10/1984 | Little | 350/96.21 |
| 4,493,212 | 1/1985 | Nelson | 250/231.19 |
| 4,521,683 | 6/1985 | Miller | 250/231.19 |
| 4,600,934 | 7/1986 | Aine et al. | 357/26 |
| 4,605,919 | 8/1986 | Wilner . | |
| 4,767,219 | 8/1988 | Kashyap | 356/345 |
| 4,833,929 | 5/1989 | Omura et al. . | |
| 4,891,255 | 1/1990 | Ciarlo . | |
| 4,916,497 | 4/1990 | Gaul et al. | 357/19 |
| 4,920,801 | 5/1990 | Church . | |
| 4,926,696 | 5/1990 | Haritonidis et al. | 73/205 |
| 4,969,359 | 11/1990 | Mikkor . | |
| 5,052,228 | 10/1991 | Haritonidis | 73/705 |
| 5,073,004 | 12/1991 | Clayton | 356/352 |
| 5,087,124 | 2/1992 | Smith | 356/358 |
| 5,109,175 | 4/1992 | Albert . | |
| 5,122,852 | 6/1992 | Chan et al. . | |

OTHER PUBLICATIONS

"Fiber—Optic Fabry–Perot Temperature Sensor Using A Low-Coherence Light Source" by Chung E. Lee and Henry F. Taylor, *Journal of Lightwave Techn.* vol. 9, No. 1, Jan. 1991.

"Simultaneous Measurement of Temperature and Strain: Cross–Sensitivity Considerations" by Farahi et al., *Journal of Lightwave Technology*, vol. 8, No. 2, Feb. 1990.

*Primary Examiner*—Samuel A. Turner
*Assistant Examiner*—Russell C. Wolfe
*Attorney, Agent, or Firm*—Lerner, David, Littenberg, Krumholz & Mentlik

[57] ABSTRACT

Fiber optic interferometric sensors and methods of manufacturing same are disclosed. These sensors comprise a unitary substrate having a channel therein and an axis extending through the channel. The unitary substrate also comprises a reflective surface extending in a plane perpendicular to the axis. An optical fiber having a terminated surface thereon is also provided. The optical fiber extends axially within the channel and is arranged so that the terminated surface and the reflective surface are movable relative to one another in response to a phenomenon to be sensed. The unitary substrate also comprises positioning means integral therewith for positioning the optical fiber within the channel. The method of manufacturing the fiber optic interferometric sensors comprise the steps of providing a unitary substrate and forming a channel therein so that an axis extends therethrough. A reflective surface integrally formed with the substrate perpendicular to the axis of the channel and an optical fiber is then inserted therein.

45 Claims, 12 Drawing Sheets

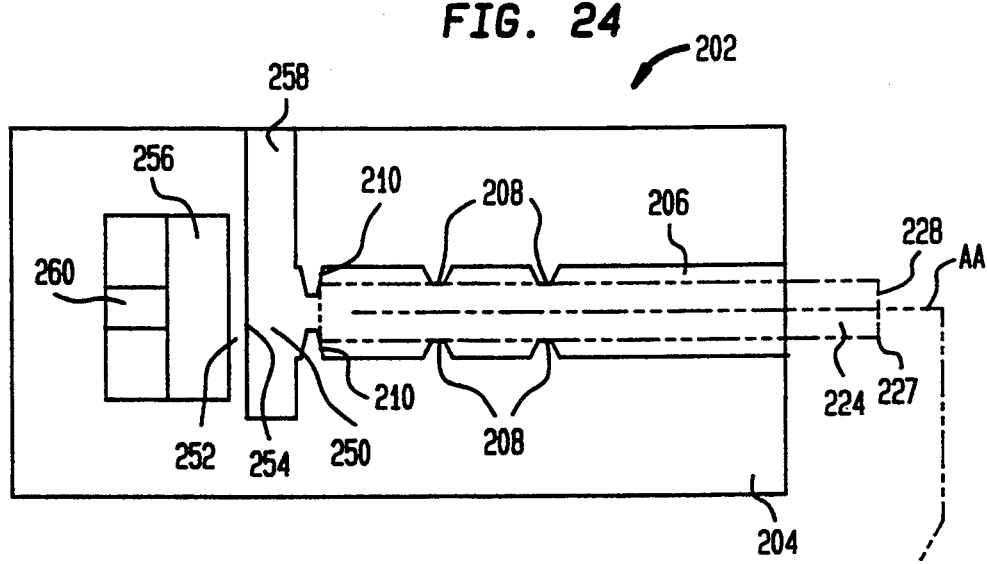
FIG. 24
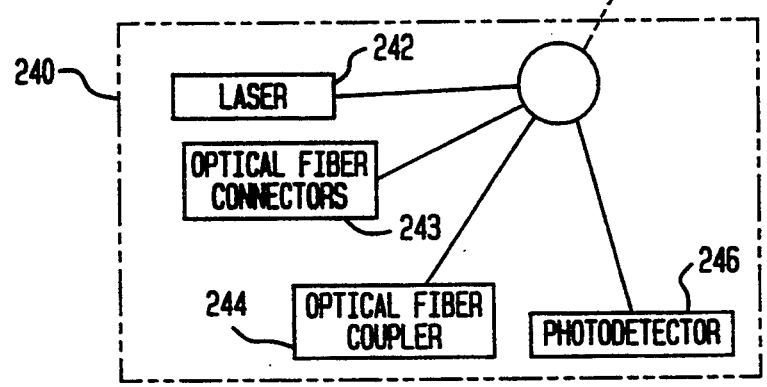
FIG. 25
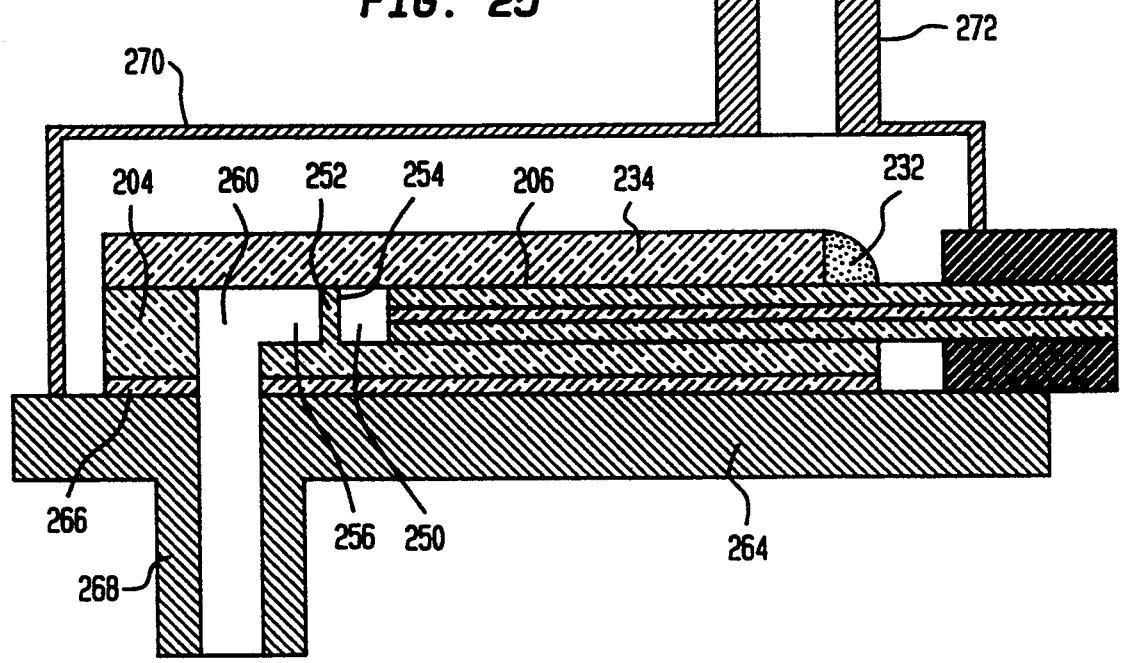

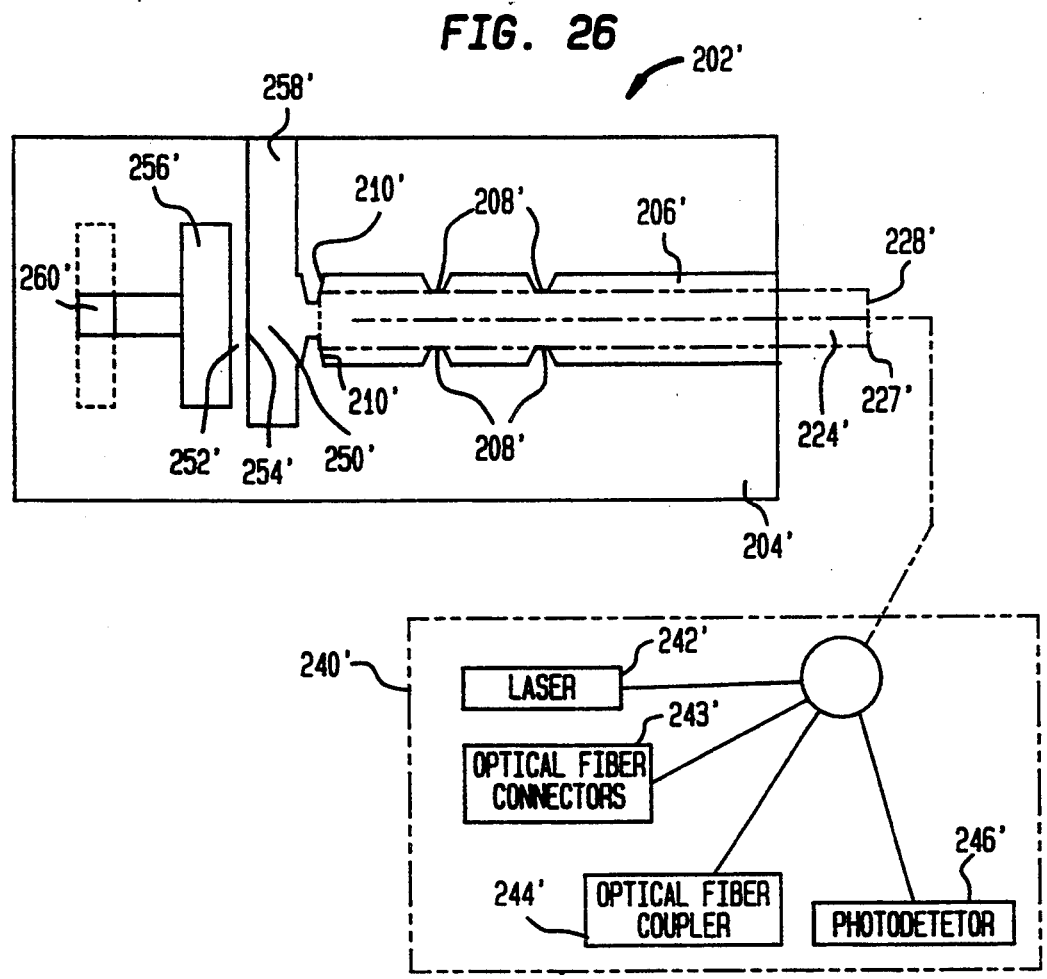
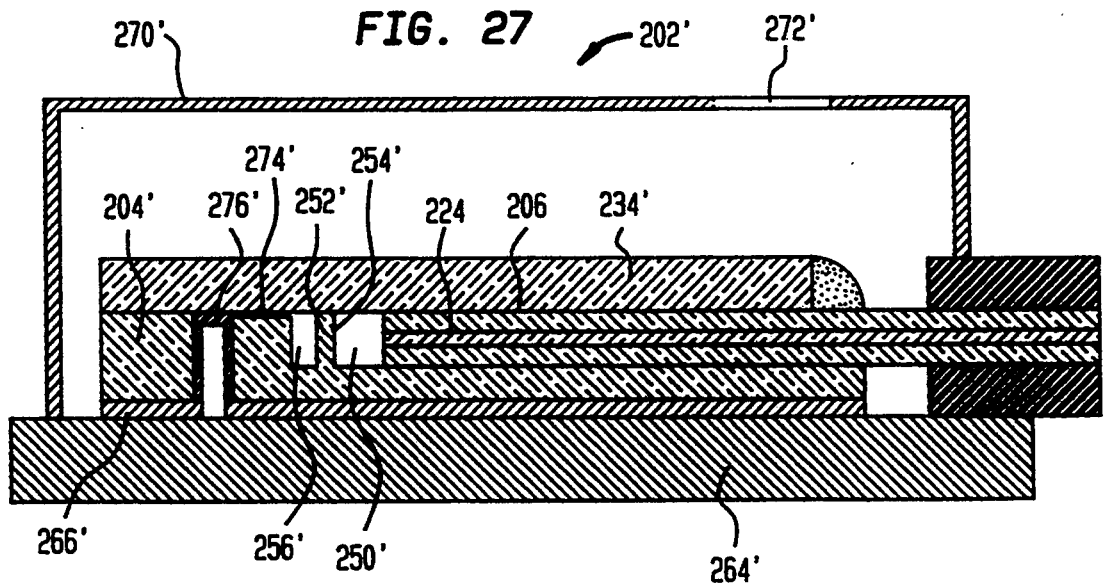

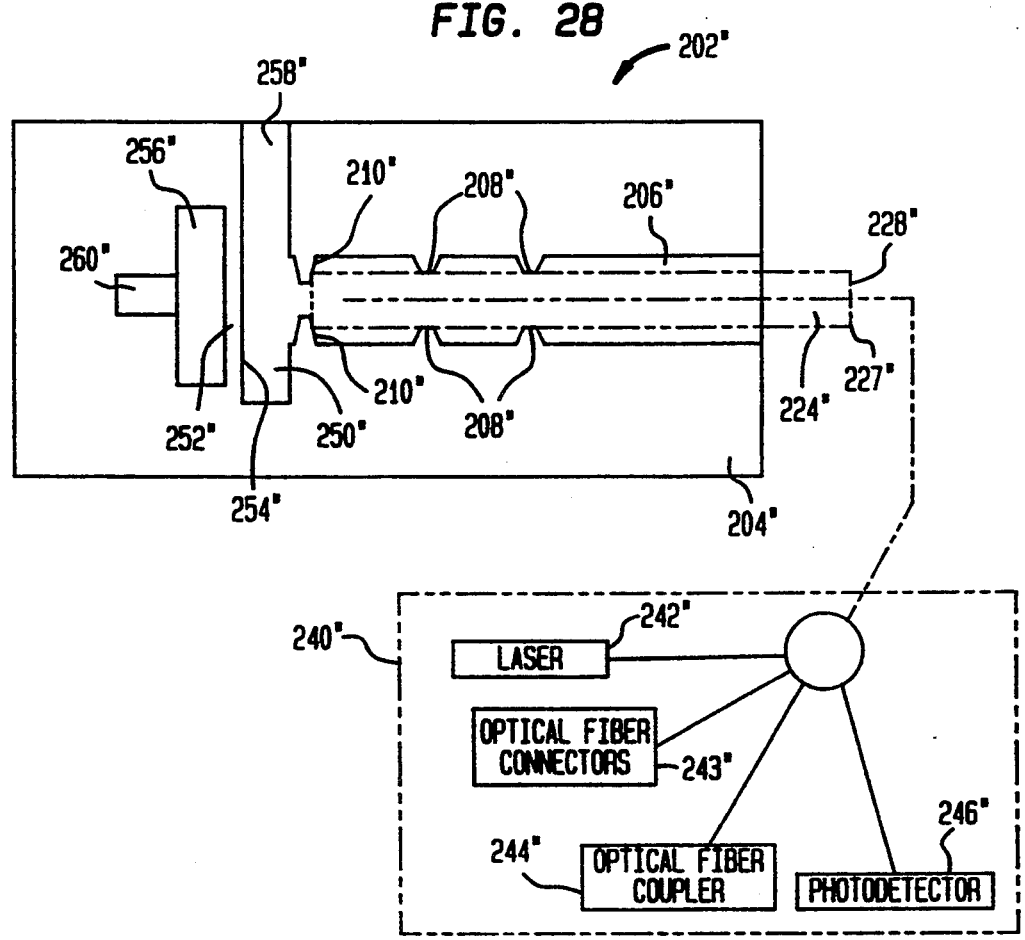
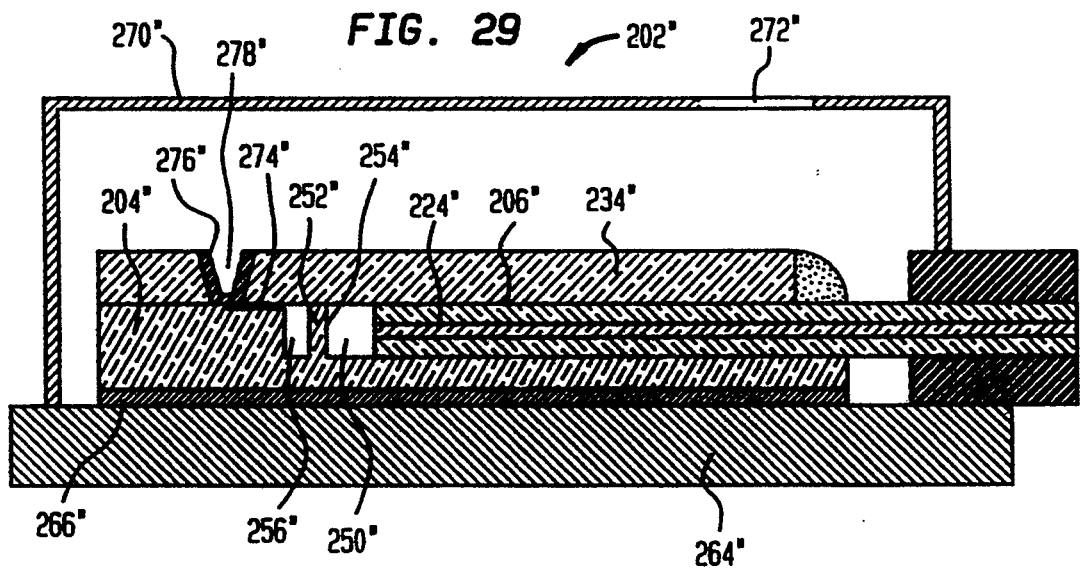

5,381,231

ONE-PIECE SILICON SUBSTRATE HAVING FIBER OPTIC STOPS AND A REFLECTIVE SURFACE THEREON AND METHODS OF MANUFACTURING SAME

FIELD OF THE INVENTION

The present invention relates to fiber optic interferometric sensors and methods of manufacturing same. More particularly, the present invention relates to fiber optic interferometric sensors including a unitary substrate having fiber optic stops and a reflective surface formed thereon and methods of manufacturing such sensors.

BACKGROUND OF THE INVENTION

A conventional electronic sensor used to detect a phenomenon such as pressure, temperature, force and acceleration typically incorporates a primary transducer having an electrical characteristic which varies in response to the phenomenon, such as a variable resistor strain gauge element, a piezoelectric element or the like. The primary transducer is mounted at the location where the phenomenon is to be detected, and is connected by electrical conductors to a secondary signal processing or recording device for converting an electrical signal from the primary transducer into useful information. Electronic sensors are susceptible to problems such as electromagnetic interference from other components, cross-talk between conductors, corrosion, poor sensitivity and poor reliability.

To alleviate these problems, fiber optic sensing systems have been proposed. These systems generally incorporate a sensor, a light source, an optical monitoring device and one or more optical fibers for connecting the sensor to the source and the monitoring device. The sensor typically includes an element which can interact with light from the source in a manner which varies dependent upon the phenomenon to be detected. Thus, light from the source is transmitted through the optical fiber to the sensor, and is then modified at the sensor in accordance with the phenomenon to be detected. The modified light is transmitted back through the optical fiber to the monitoring device, which in turn detects the change in the light and provides information relating to the phenomenon. Merely by way of example, the sensor may include a reflective element arranged so that the position of the reflective element, and hence the phase of the reflected light, changes in response to the phenomenon to be detected. The monitoring device may be arranged to monitor the phase of the reflected light.

Fiber optic systems offer significant advantages over alternative systems such as conventional electromagnetic systems. An optical fiber can be described as a glass or ceramic conduit through which light waves are permitted to travel. The optical fiber should be designed so that only a small percentage of the light waves transmitted therein will be permitted to exit through the side walls of the fiber.

A typical optical fiber includes a core, having a predetermined refractive index, and cladding entirely surrounding the core, having a predetermined refractive index greater than that of the core. Such an arrangement permits light waves to be guided through the core of the optical fiber with little leakage through the fiber wall. The refractive index represents the ratio of the velocity of light, which passes through the optical fiber material, to the velocity of light passing through a vacuum which is known to be represented by a constant, i.e., $3.0 \times 10^8$ m/s. Thus, the velocity that light waves travel through a particular material is inversely related to the index of refraction. In this regard, the velocity at which light waves travel through a particular material is lower for materials having a relatively high index of refraction than it is for materials having a relatively low index of refraction.

The advantages of fiber optic sensors over conventional sensors have spurred inventors to expend a great deal of time and effort in attempting to develop new fiber optic sensors that are effective for use in various applications, and methods of manufacturing the same in large quantities and at a low cost. Indeed, the prior art is replete with such attempts. However, an analysis of such prior art indicates that additional problems have arisen. One problem which has particularly plagued prior art fiber optic sensors is the need for precise alignment of plural substrates constituting the sensor with one another and/or with the optical fiber.

In this regard, U.S. Pat. No. 5,087,124 to Smith et al. discloses a fiber optic interferometric pressure sensor and a method of manufacturing same. The sensor is manufactured by initially applying anisotropic etching techniques to separate silicon substrates. An optical fiber is then sandwiched between the two substrates. One of the substrates includes a deflectable membrane, and the other substrate includes an immobile reflective surface obliquely arranged with respect to the end face of the optical fiber. The specification of the Smith, et al. patent specifically states that it is particularly important for the immobile reflective surface on one of the substrates to be precisely aligned with the deflectable membrane on a second substrate and the end of the optical fiber (see Col. 4, line 64 - col. 5, line 7).

U.S. Pat. No. 4,916,497 to Gaul et al. discloses an integrated circuit including an optical fiber and a method of fabrication in which the circuits are formed by bonding two substrates together and inserting an optical fiber therebetween. A reflective surface is formed on one of the substrates and is arranged at an obtuse angle with respect to the end face of the optical fiber.

U.S. Pat. No. 5,052,228 to Haritonidis discloses a shear stress measuring device including a deflectable diaphragm arranged in a plane perpendicular to the axis of an optical fiber. With regard to fiber optic Fabry-Perot temperature sensors, results of experiments showing favorable sensor performance were reported in Lee, et al., "Fiber Optic Fabry-Perot Temperature Sensor Using a Low-Coherence Light Source," *Journal of Light Wave Technology*, vol. 9, no. 1, pp. 129–133, January 1991.

Despite these and other efforts in the art, there has been a considerable need for an improved fiber optic interferometric sensor, and methods of manufacturing same. The present invention addresses these needs.

SUMMARY OF THE INVENTION

One aspect of the present invention provides a fiber optic interferometric sensor for sensing a phenomenon such as acceleration, temperature or pressure. According to this aspect of the present invention, a unitary substrate having a channel therein is provided. The substrate also includes a reflective surface defining a plane perpendicular to the axis of the channel. A positioning device such as positioning studs is also integral with the substrate and is adapted to position an optical fiber in the channel. The optical fiber extends axially within the channel and includes a terminated surface. The terminated surface and the reflective surface are adapted to be movable relative to one another in response to the particular phenomenon to be sensed.

Preferably, the unitary substrate has stop means integral with the substrate arranged adjacent to the terminated surface of the optical fiber to retain a minimum predetermined distance between the terminated surface and the reflective surface. In a further preferred embodiment, the channel includes a retaining end and the stop means comprises at least one stopping stud arranged adjacent the retaining end. In this aspect of the present invention, the at least one stopping studs is adapted to abut the terminated surface of the optical fiber to arrest movement thereof beyond the retaining end. The reflective surface is axially movable relative to the at least one stopping stud and the channel in which the optical fiber is retained. Thus, the terminated surface of the optical fiber may be relatively fixed in position by the stopping stud, and the reflective surface may move relative to the terminated surface.

The sensor desirably includes securing means for securing the optical fiber within the channel of the unitary substrate. The positioning means of the unitary substrate may include a plurality of positioning studs, at least two of said studs being arranged on opposite sides of the channel to define a passageway therebetween. Most preferably, the passageway is coaxial with the axis of the channel and has a predetermined width so that the optical fiber can precisely fit between the oppositely arranged positioning studs.

In a further aspect of the present invention, the unitary substrate includes at least one flexible portion and a sensing mass integral therewith. The reflective surface is formed on the sensing mass and is movable relative to the terminated surface of the optical fiber. It is also preferable for the unitary substrate to include a plurality of inner walls which define a recess. The sensing mass is suspended in the recess by the at least one flexible portion.

The at least one flexible portion may comprise a plurality of movable beams integral with the unitary substrate. Each of the beams includes a first end connected to one of the inner walls and a second end connected to the sensing mass for supporting the sensing mass in the recess.

In another aspect of the present invention, the unitary substrate of the present interferometric fiber optic sensor comprises a first plurality of inner walls which define a first cavity therein. The first cavity is sealed and adapted to retain a fluid therein. The reflective surface is arranged on one of the inner walls and is deflectable in response to expansion and contraction of the fluid due to heating and cooling thereof. Thus, the sensor can detect changes in temperature. According to this aspect of the present invention, the reflective surface is axially movable with respect to the channel of the optical fiber while the terminated surface of the optical fiber is fixed against axial movement relative to the channel. The sensor, according to this aspect of the present invention, may include a second plurality of inner walls defining a second cavity therein. The second cavity is arranged adjacent the first cavity and includes an open end in communication with an area outside of the substrate.

In another aspect of the present invention, the reflective surface on the unitary substrate is fixed against axial movement while the terminated surface of the optical fiber is axially movable relative to the channel. For example, the fiber may be fixed to the substrate at the end of the channel remote from the reflective surface, leaving the terminated end of the fiber free to move relative to the reflective surface in response to differential thermal expansion of the substrate and fiber, so that the sensor can detect temperature changes.

Where the sensor is arranged to detect changes in temperature, the sensor desirably includes heat absorbing means connected to the unitary substrate for absorbing heat and transferring same to the sensor. Most preferably, the heat absorbing means comprises an infrared absorbent material mounted to the unitary substrate. Additionally, it is preferable for the present sensor to include a cover mounted on the substrate so that the channel and the first cavity are enclosed therebelow.

In another aspect of the present interferometric fiber optic sensor, the unitary substrate includes pressure sensing means for detecting a pressure differential between a controlled environment and an ambient environment. Most preferably, the pressure sensing means comprises a deflectable diaphragm integral with the unitary substrate and including the reflective surface thereon.

It is also desirable for the pressure sensing means to comprise a first plurality of internal walls defining a first cavity therein, and a second plurality of internal walls defining a second cavity. The deflectable diaphragm is preferably arranged between the first and second cavities for deflectable movement along the axis of the channel. It is also desirable for the first cavity to be sealed so that a controlled environment exists therein. The second cavity is preferably arranged adjacent to the first cavity and includes an end which defines an opening to an area outside of the unitary substrate so that communication is permitted between an ambient environment and the deflectable diaphragm. In each of the foregoing aspects of the present invention, the unitary substrate preferably comprises a (1,1,0) silicon wafer.

In another aspect of the present invention, a fiber optic interferometric sensing system is provided. The sensing system comprises a sensor as discussed hereinabove and further includes a light source in communication with a second surface of the optical fiber remote from the terminated surface of the fiber and, typically, remote from the sensor. The light source is arranged to apply light to the second surface. The optical fiber is adapted to transmit the light to the terminated surface and thus to the reflective surface of the sensor and is also adapted to receive light reflected from the reflective surface onto the terminated surface. The sensing system further comprises optical monitoring means for measuring a phase shift in the light waves which have been projected on the reflective surface and reflected therefrom. The phase shift is at least partly dependent on the relative movement between the reflective surface and the terminated surface of the optical fiber.

A further aspect of the present invention provides a method of manufacturing a fiber optic interferometric sensor including a unitary substrate. The method comprises the steps of providing a unitary substrate and forming a channel therein, the channel having an axis therethrough. The method also comprises the steps of forming a reflective surface integral with the substrate perpendicular to the axis of the channel and providing an optical fiber having a terminated surface thereon within the channel. Preferably, the method also comprises the steps of forming at least one positioning stud in the channel integral with the substrate, so that an optical fiber can be secured therein. Most preferably, the at least one positioning stud comprises a plurality of positioning studs and the method comprises the further step of arranging at least two of the positioning studs on opposite sides of the channel so that a passageway is formed therebetween, the passageway being coaxial with the axis of the channel. The method of the present invention also comprises the step of forming at least one stopping stud desirably adjacent a retaining end of the channel arranged to abut the terminated surface of the optical fiber so that the optical fiber is prevented from moving axially past the retaining end.

It is desirable for the step of providing the substrate to comprise the step of providing a (1,1,0) silicon wafer. It is also desirable for the steps of forming a channel and a reflective surface integral with the substrate to comprise the step of anisotropically etching the substrate. Most preferably, the reflective surface, the stopping stud and the positioning studs are all formed in a single etching process. Thus, the positions of these elements relative to one another can be precisely controlled at low cost. For example, the process may include the steps of providing a photosensitive layer on the substrate, exposing the photosensitive layer to patternwise illumination through a mask having the desired pattern and then treating the photosensitive layer and substrate so as to etch the substrate only in the exposed areas or only in the unexposed areas. In such a process, the relative positions of the elements formed are fixed by the mask. In a particularly preferred method according to this aspect of the present invention, the method includes the further step of providing a cover on the substrate above the reflective surface and the channel.

The apparatus and methods according to the foregoing aspects of the present invention provide a fiber optic interferometric sensor which can be used in a wide range of applications, which avoids the problems associated with prior art sensors and which can be manufactured more efficiently or at a lower cost than has heretofore been possible. These and other features and advantages of the present invention will be more readily apparent when read in conjunction with the detailed description and the accompanying drawings which follow.

BRIEF DESCRIPTION OF THE DRAWINGS

FIG. 24 is a top plan view of an interferometric fiber optic pressure sensor illustrating a preferred embodiment of the present invention.

FIG. 25 is a side, cross-sectional view of the pressure sensor shown in FIG. 24 illustrating additional components thereof.

FIG. 26 is a top plan view of an interferometric fiber optic pressure sensor illustrating a second preferred embodiment of the present invention.

FIG. 27 is a side, cross-sectional view of the pressure sensor shown in FIG. 26 illustrating additional components thereof.

FIG. 28 is a top plan view of an interferometric fiber optic pressure sensor illustrating a third preferred embodiment of the present invention.

FIG. 29 is a side, cross-sectional view of the pressure sensor shown in FIG. 28 illustrating additional components thereof.

DETAILED DESCRIPTION OF THE PREFERRED EMBODIMENTS

Figure 1:
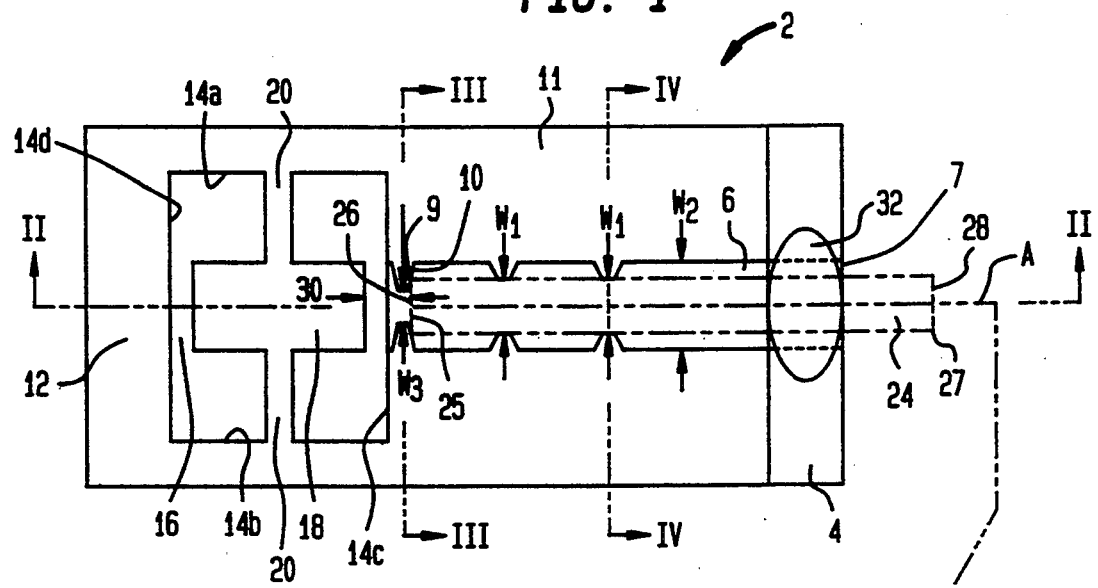
FIG. 1 is a top plan view of an interferometric fiber optic acceleration sensor in accordance with a preferred embodiment of the present invention.
Figure 2:
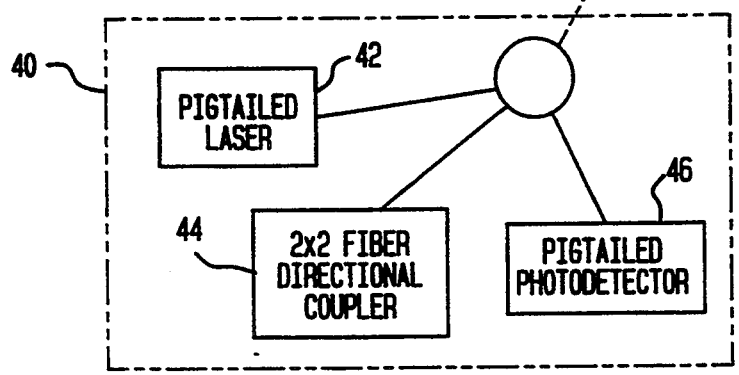
FIG. 2 is a side, cross-sectional view taken along line II—II of the sensor shown in FIG. 1.
Figure 2:
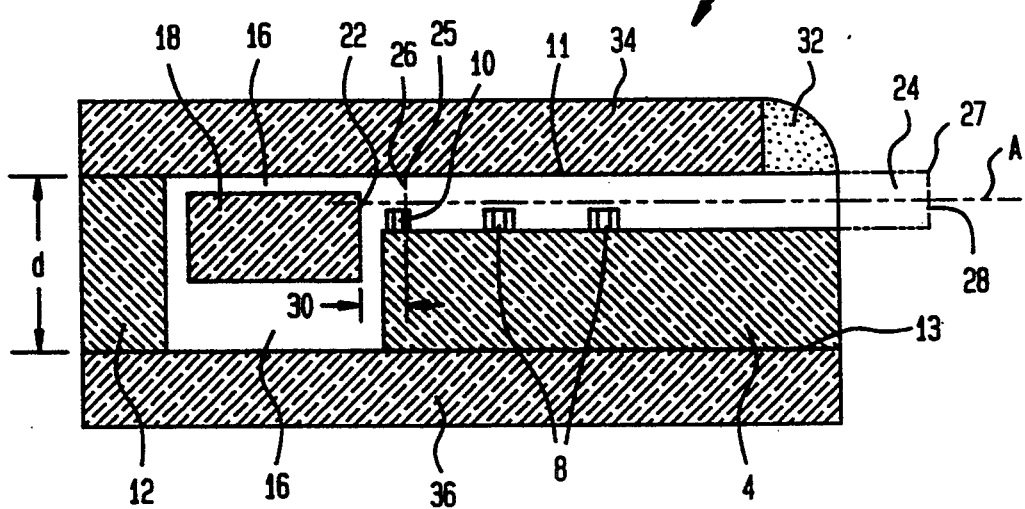

A fiber optic interferometric acceleration sensor, i.e., an accelerometer, generally designated 2, is shown in FIGS. 1 and 2. The accelerometer 2 includes a (1,1,0) unitary silicon substrate 4 having an area of approximately 25.8 cm$^2$ with a thickness of approximately 286 $\mu$m. The unitary substrate 4 includes a channel 6 having a first width $w_1$ of approximately 40 $\mu$m and a second width $w_2$ of approximately 400 $\mu$m. The channel extends from the distal end 7 of the substrate 4 to a second end 9 at an intermediate location within the substrate 4.

As best shown in FIGS. 1 and 2, the channel 6 includes a plurality of opposing positioning studs 8 defining the width $w_1$ therebetween. An imaginary axis A, shown in phantom, extends through the center of the channel 6 and defines a midpoint between opposing positioning studs 8. A pair of stopping studs 10 are arranged at the second end 9 of the channel 6 and define a third width $w_3$ therebetween. As shown in FIGS. 1 and 2, the imaginary axis A also extends through the center point of the width $w_3$.

The unitary substrate 4 also comprises a frame 12 which surrounds the channel 6 and extends beyond the second end 9 thereof to define an outer perimeter of the substrate 4. As shown in FIGS. 1 and 2, the frame 12 includes a plurality of inner walls 14a–14d encompassing a rectangular area and defining a recess 16 therebetween. The distal-most wall 14 is arranged adjacent the stopping studs 10.

The recess 16 is preferably formed by anisotropic etching, discussed in more detail hereinbelow, and has a depth d of approximately 285 $\mu$m as best disclosed in FIG. 2. A pair of opposing flexible beams 20 extend from inner walls 14a and 14b of the frame 12 and project toward the center of the recess 16. The flexible beams 20 are connected to a rectangular mass be and support the mass in a suspended condition within the recess 16 as shown in FIG. 1. As will be discussed in more detail hereinbelow, the mass 18 is movable, by virtue of the flexible beams 20, along the axis A. Movement of the mass 18 is limited by proximal-most and distal-most inner walls 14c and 14d.

A reflective surface 22 is arranged on the distal-most side of the mass be facing the channel 6, and extends in a plane perpendicular to the axis A. Each of the foregoing components of the interferometric fiber optic accelerometer 2 are integral with the unitary silicon substrate 4.

A single-mode optical fiber 24 is arranged between the plurality of positioning studs 8 within the channel 6. The optical fiber 24 includes a terminated end 25 having a terminated surface 26 and second end 27 having a second surface 28 remote from the terminated surface. As shown in FIGS. 1 and 2, the terminated surface 26 abuts the stopping studs 10 when the optical fiber 24 is arranged in assembled position within the channel 6. The positioning studs 8 are adapted to engage opposite sides of the outer perimeter of the cylindrical optical fiber 24 to centrally locate the fiber 24 along the axis A of the channel 6. The fiber 24 is fixed adjacent the distal end 7 of the channel 6 by an adhesive 32 which prevents the fiber 24 from moving therein. The second end 27 of the fiber 24 extends distally beyond the distal end 7 of the channel 6 and is adapted to interact with interferometric system components generally designated 40. Such components are depicted in block form in several of the figures and include a pigtailed laser 42, a 2×2 fiber directional coupler 44 and a pigtailed photodetector 46. The pigtailed feature of these components permit them to be easily connected to and aligned with the second surface 28 of the optical fiber 24.

As can be appreciated from FIGS. 1 and 2, with the terminated end 25 of the optical fiber 24 abutting stopping studs 10, there is a gap 30 between the reflective surface 22 and the terminated surface 26 of the optical fiber 24. In this regard, the gap 30 is approximately 20 $\mu$m and, as will be discussed more fully below, defines a predetermined reference point for optical measurements when the mass 18 is arranged in its normal, static position.

A glass top cover 34 and bottom cover 36 are anodically bonded to the top and bottom of the silicon substrate 4. The glass covers 34 and 36 serve to both protect the silicon substrate 4 and to prevent particulate contamination from settling on the optical fiber 24 or within the channel 6 or recess 16. As best shown in FIG. 2, the glass cover 34 extends from the proximal-most end of the substrate 4 to approximately 1,000 $\mu$m away from the distal end 7 thereof. Thus, the glass cover 34 encompasses an area slightly smaller than the area defined by the top surface of the substrate 4, so as to provide room for adhesive 32. The glass cover 36 is sized and shaped to cover the entire bottom surface of the substrate 4.

Figure 3:
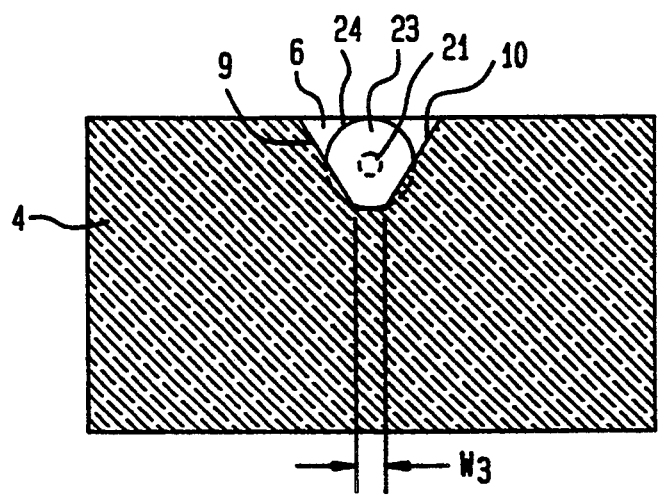
FIG. 3 is a front, cross-sectional view taken along line III—III of the sensor shown in FIG. 1.

The relationship between the stopping studs 10 and the terminated surface 26 of the optical fiber 24 is best shown in FIG. 3. In this regard, FIG. 3 clearly illustrates that the optical fiber 24 abuts the stopping studs 10 at the end 9 of the channel 6. Additionally, FIG. 3 illustrates the proportional difference in size between the optical fiber core 21 and the optical fiber cladding 23 in the preferred single-mode optical fiber 24. It should be appreciated that the fiber core 21 is the portion of the optical fiber 24 which transmits light waves generated by the laser 42 between the second surface 28 and the terminated surface 26. In the single-mode optical fiber 24 of the present invention, the core 21 has a diameter of approximately 4–15 $\mu$m. The fiber cladding 23 is that portion of the optical fiber 24 that surrounds the core 21 and retains the light waves within the core 25 along the entire length thereof. In the preferred embodiment of the present invention shown in FIG. 3, the fiber cladding 23 has a diameter of approximately 80–150 $\mu$m. The ratio between the diameters and the differences in the index of refraction between the core 21 and the cladding 23 assures substantially parallel transmission of light waves within the core 21 of the single-mode optical fiber 24. The stopping studs 10 abut only the cladding 23, so that light transmitted through the core 21 may pass without obstruction.

Figure 4:
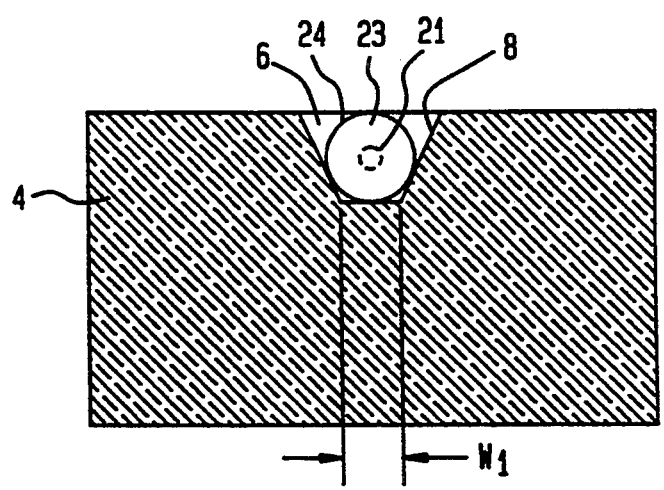
FIG. 4 is a front, cross-sectional view taken along line IV—IV of the sensor shown in FIG. 1.

As discussed above, the positioning studs 8 are arranged on opposite sides of axis A within the channel 6 and abut selective locations on the perimeter of the fiber 24 when the fiber is arranged in its assembled position within the channel 6. The relationship between the optical fiber 24, the positioning studs 8 and the channel 6 can best be appreciated with reference to FIG. 4. As shown therein, the optical fiber 24 is precisely positioned in the center of the channel 6 and is retained in such position, in large part, by the location and shape of the positioning studs 8.

In operation, the present accelerometer 2 can be used to control the dynamic behavior of aircraft, automobiles, ships, and the like. The acceleration measurement results from a change in the size of the gap 30 between the terminated surface 26 of the optical fiber 24 and the reflective surface 22 of the mass 18. In this regard, when the accelerometer 2 is not subjected to any acceleration in the axial direction, the gap 30 defines a predetermined distance which represents a zero reference point for purposes of acceleration measurement. It should be appreciated that the zero reference point is maintained, in part, by the abutment between the stopping studs 10 and the terminated surface 26 of the optical fiber 24. This arrangement prevents the terminated surface from moving proximally beyond the second end 9 of the channel 6; thus, maintaining the appropriate predetermined gap 30 between the terminated surface 26 and the reflective surface 22, at all times.

When the accelerometer 2 is subjected to an acceleration in the axial direction, such acceleration acts upon the silicon substrate 4. In particular, the suspended mass 18 reacts to the acceleration by moving within the recess 16. Thus, the gap 30 between the reflective surface 22 and the terminated surface 26 of the fiber 24 changes in response to acceleration forces. Such change results in a modulation of the path length of a light beam generated by the laser 42, which travels from the terminated surface 26 of the fiber to the reflective surface 22 and back to the terminated surface 26. An interferometric intensity signal is produced in response to the phase difference between the light beam reflected from the terminated surface 26 of the fiber itself and the light beam reflected from the reflective surface 22 of the mass be. The intensity signal is then detected by a photodetector 46 and is translated to represent the acceleration change with great accuracy.

Figure 5:
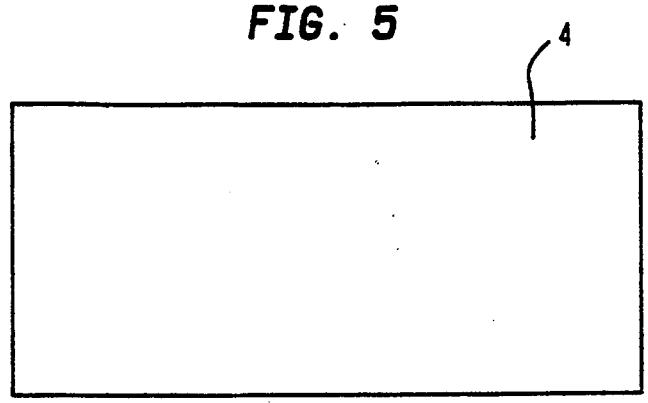
FIG. 5 is a top plan view of a silicon substrate provided in accordance with the first step of method of manufacturing the present invention.

In accordance with a preferred method of manufacturing the accelerometer 2 of the present invention (FIGS. 5–17), a starting silicon substrate 4 is provided. As discussed above, the substrate 4 encompasses an area of approximately 25.8 square centimeters and has a thickness of approximately 286 μm. Preferably, at least one set of the substrate edges are aligned within about 2° of the <110> direction, which defines the intersections of the {111} and the {110} planes at the surface of the silicon substrate 4. A silicon substrate 4 provided in accordance with this first step in the present method is illustrated in FIG. 5.

Figure 6:
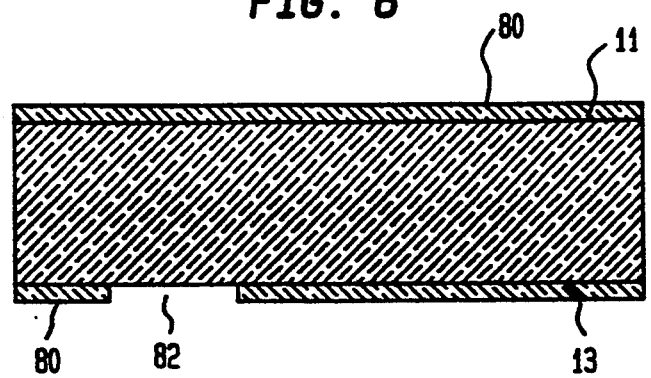
FIG. 6 is a side, cross-sectional view of the substrate shown in FIG. 5 illustrating a further step according to the method of the present invention.
Figure 7:
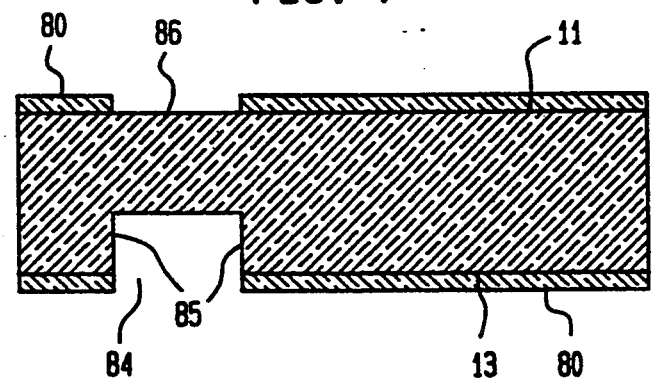
FIG. 7 is a side, cross-sectional view of the substrate shown in FIG. 5 illustrating a further step according to the method of the present invention.

The substrate 4 is then subjected to a thermal oxidation process in which a 1 μm thick oxide layer 80 is formed on the top surface 11 and bottom surface 13 of the substrate 4, respectively. Conventional photolithographic steps are then used to selectively remove a part of the oxide layer on the bottom surface, thereby forming a channel 82 in the oxide layer as seen in FIG. 6. In these conventional steps, a photosensitive masking material (not shown) is applied to cover the bottom oxide layer, and light is applied in patternwise fashion so as to selectively expose only those areas on the bottom surface outside of the region to be occupied by the channel. The exposed portions of the masking material cure to form a solid mask in the regions outside of the channel. The remaining portions, in the area of the bottom surface to be occupied by the channel remain in an uncured condition. Such masking material serves as an etch mask layer and may comprise silicon dioxide, silicone nitride, or the like. The substrate is then subjected to a washing step sufficient to remove the uncured masking material, leaving the oxide layer exposed in the region to be occupied by the channel. At this point, the substrate is immersed in an acidic solution commonly referred to as an "oxide etch." An oxide etching solution comprising 6 parts of NH₄F and 1 part of HF, commonly referred to in the microfabrication arts as a "6:1 buffered oxide etch", is preferred. The exposed oxide layer is dissolved and hence removed to form the channel 82. The oxide layer in those regions of the bottom surface protected by the masking material remains. The masking material is then removed, leaving the substrate in the condition illustrated in FIG. 6.

Once the channel has been formed in the oxide layer, the substrate is immersed in an alkaline etching solution, typically a solution containing about 40 kg of KOH and 100 ml water or isopropyl. The alkaline solution is maintained at about 50° C.

The substrate may be carried on an inert holder such as one formed from a flourocarbon polymer, and the holder may be oscillated, at a rate of about 60 strokes/min. The alkaline solution does not attack the oxide layer to any substantial degree, but does etch the unoxidized silicon exposed within channel 82; thus, dissolving the silicon in an anisotropic fashion.

The starting (110) silicon substrate 4 preferably has two sets of {111} planes that are perpendicular to the top surface 11 thereof, and has two additional sets of {111} planes which intercept the top surface 11 at an angle of 35.6°. Since the anisotropic etching solution etches the {111} planes a significantly slower rate than other planes within the substrate, trenches having vertical walls extending in planes perpendicular to the top surface 11 of the silicon substrate 4, are easy to form. Thus, the etching produced by the anisotropic solution proceeds preferentially in the <110> and <100> crystallographic directions, so that a trench 84 (FIG. 7) is formed. As the anisotropic etching step progresses, the depth of the trench increases, but the width of the trench 84 remains substantially equal to the width of the channel 82 in the oxide layer. Thus, the side walls 85 of the channel formed during this process are substantially vertical, i.e., substantially perpendicular to the top and bottom surfaces 11 and 13 of the substrate. Moreover, the trench is precisely aligned with the <110> crystallographic direction of the substrate. Under the preferred conditions discussed above, the depth of the channel increases at a rate of about 22 μm/hour. The process typically continues for about seven (7) hours, until trench 84 is about 154 μm deep.

Figure 8:
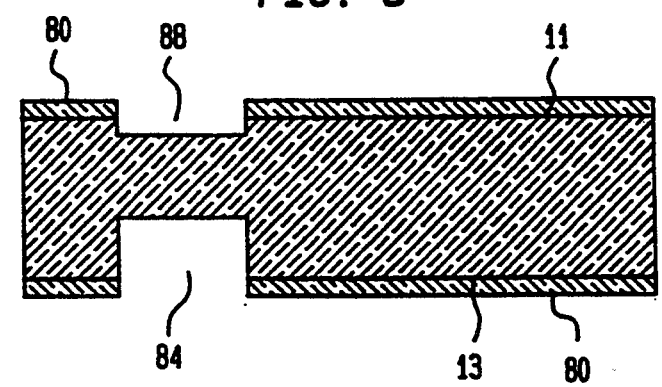
FIG. 8 is a side, cross-sectional view of the substrate shown in FIG. 5 illustrating a further step according to the method of the present invention.

In the next stage of the process, a channel 86 is formed in the oxide layer 80 on the top surface 11 of the substrate 4 by photolithography and etching as discussed above. Again, the <110> edge of the substrate 4 and the trench 84 therein are used as alignment guides. Next, plasma etching is performed using the photoresist mask to form a 2 μm deep trench 88 as best shown in FIG. 8.

Figure 9:
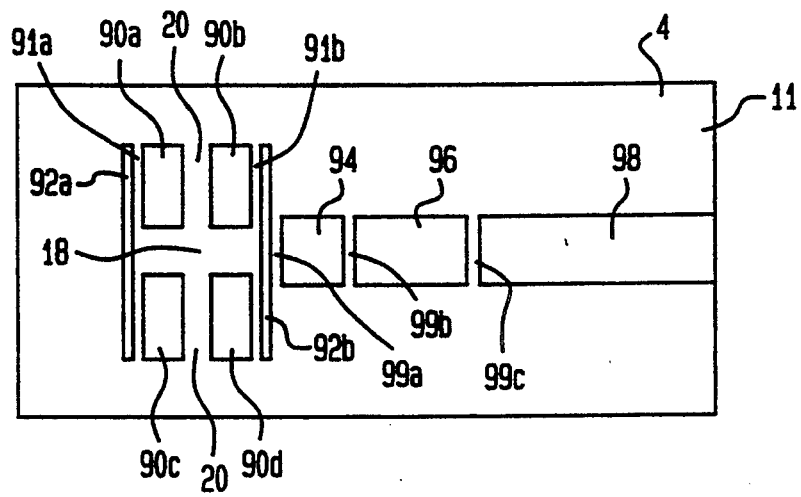
FIG. 9 is a top plan view of the silicon substrate illustrating the development of the substrate at a further step of the method of the present invention.

A 6:1 buffered oxide etch solution is then again applied to selective areas on the top surface 11 of the silicon substrate 4 to form four symmetrical rectangular openings 90a–90d within the 2 μm deep trench 88. Additionally, three aligned rectangular areas 94, 96 and 98, which will later form the channel 6, are formed on the top surface of the silicon substrate 4. The same 6:1 buffered oxide etch solution is also used to form a pair of elongate rectangular areas 92a and 92b. Rectangular area 92a is arranged adjacent to and parallel with rectangular areas 90a and 90c, and rectangular area 92b is similarly arranged adjacent to and parallel with rectangular areas 90b and 90d. As clearly shown in FIG. 9, each of the rectangular areas 94, 96 and 98 have long sides arranged perpendicular to the long sides of the rectangular areas 90a–90d, 92a–92b, formed within the trench 88. At this stage of the present method, the appearance of the top surface 11 of the substrate 4 can best be appreciated from FIG. 9. The area which will ultimately form the mass 18 and the flexible beams 20 connected thereto can be recognized at this stage of the present method and is also shown in FIG. 9.

Figure 10:
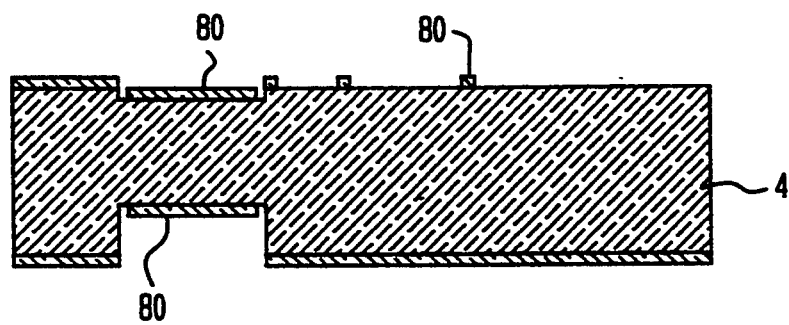
FIG. 10 is a side, cross-sectional view of the substrate shown in FIG. 9.
Figure 11:
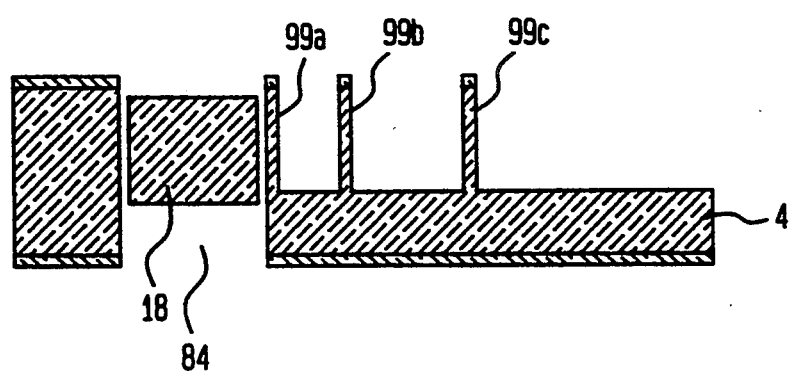
FIG. 11 is a side, cross-sectional view showing the development of the substrate in accordance with a further step of the method of the present invention.
Figure 12:
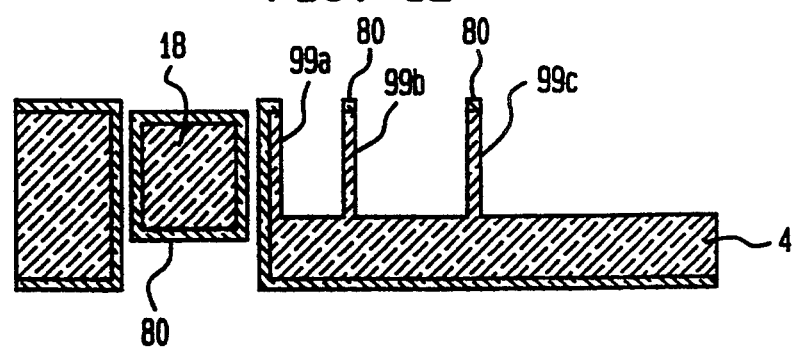
FIG. 12 is a side, cross-sectional view showing the development of the substrate in accordance with a further step of the method of the present invention.
Figure 13:
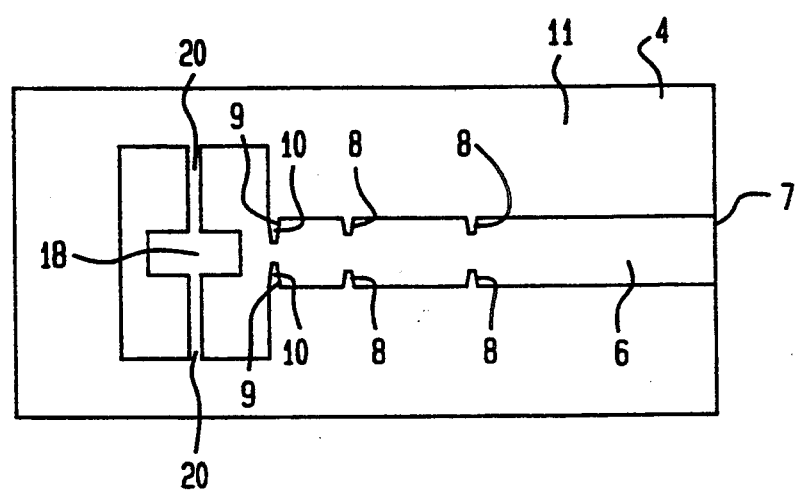
FIG. 13 is a top plan view of the silicon substrate illustrating the development of the substrate at a further step of the method of the present invention.
Figure 14:
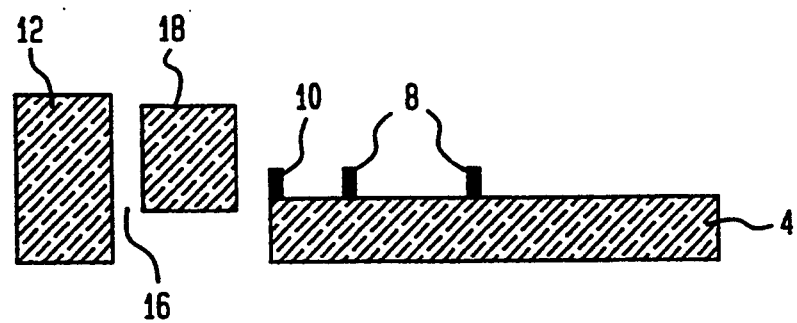
FIG. 14 is a side, cross-sectional view of the substrate shown in FIG. 13.
Figure 15:
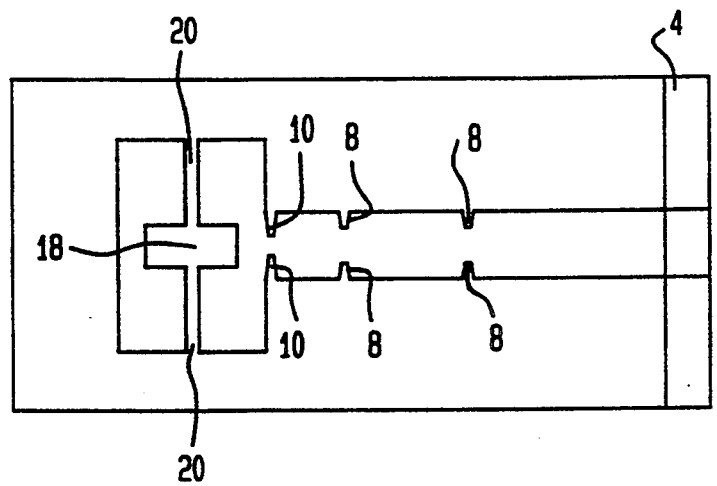
FIG. 15 is a top plan view of the silicon substrate illustrating the development of the substrate at a further step of the method of the present invention.
Figure 16:
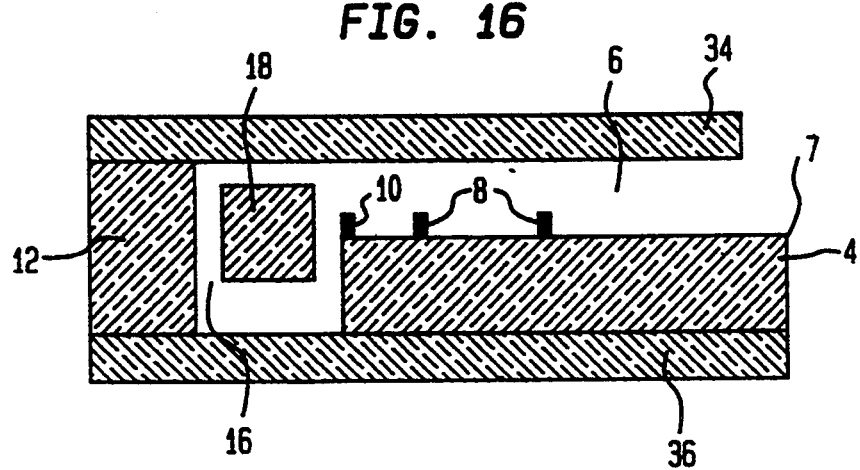
FIG. 16 is a side, cross-sectional view illustrating the substrate with top and bottom covers secured thereto in accordance With a further step of the method of the present invention.
Figure 17:
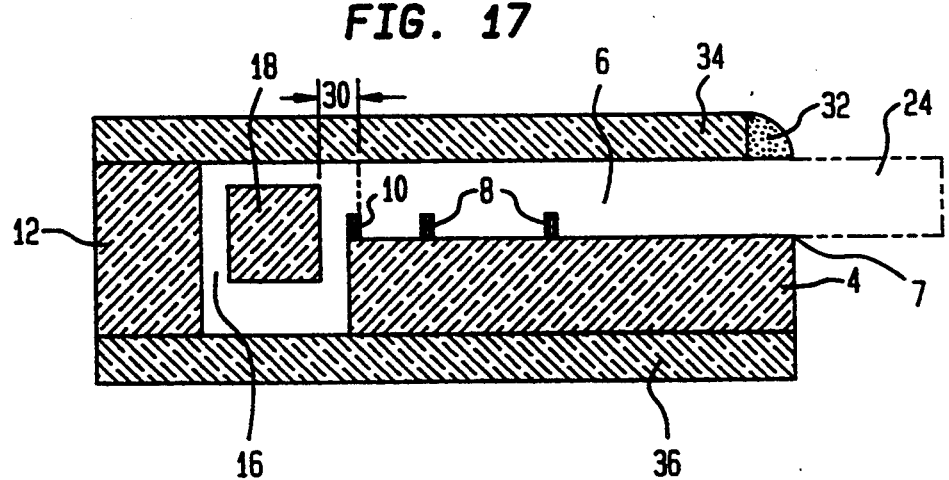
FIG. 17 is a side, cross-sectional view illustrating the substrate with top and bottom covers secured thereto and an optical fiber inserted therein in accordance with a further step of the method of the present invention.

As illustrated in FIG. 10, an oxide layer 11, which exists between rectangular areas 94, 96 and 98, has a very narrow width of about 3 μm. The silicon substrate 4 with the exposed rectangular areas thereon, i.e., rectangular areas 90a–90d, 92a–92b, 94, 96 and 98, is then subjected to the same anisotropic etching process as that discussed above, i.e., the substrate 4 is placed in a glass container having a solution of 40 percent by weight KOH therein at 50° C. However, this time, the etching process continues for about six hours and results in the formation of trenches approximately 132 μm deep at the areas previously defined by the exposed silicon rectangular areas 90a–90d, 92, 94, 96 and 98. As shown in FIG. 11, the resulting trenches have sacrificial membranes 99a–99c and sacrificial beams 91a–9d therebetween. The sacrificial membranes 99a–99c and the sacrificial beams 91a–9d, typically have a width of approximately 3 μm. A 2 μm thick oxide layer 80 is formed on all of the sacrificial membranes and the sacrificial beams and thus, most of the silicon thereof is turned into the oxide layer 80. At this stage of the present method, the silicon substrate has a cross-sectional view as shown in FIG. 12.

The sacrificial beams 91a–9d and the sacrificial membranes 99a–99c are then removed by etching the substrate 4 in a buffer HF solution. This etching step thereby forms the channel 6, the positioning studs 8, the stopping studs 10, the mass 18, the reflective surface 22 thereon, the movable beams 18, and the frame 12. As can be appreciated from FIGS. 13 and 14, each of the foregoing features are integrally formed in accordance with the present method with the unitary silicon substrate 4. It is preferable for glass covers 34 and 36 to be anodically bonded to the top surface and the bottom surface of the silicon substrate 4 respectively. This step of the present method can be best appreciated with preference FIGS. 15 and 16 wherein the relationship between the integral components of the unitary silicon substrate 4 and the protective glass covers 34 and 36 is shown. Preferably, a single-mode optical fiber 24 is then inserted in the channel 6 between the silicon substrate 4 and the glass cover 34. When the fiber 24 is placed in its fully assembled position within the channel 6, the positioning studs 8 will assure that the optical fiber 24 is centrally aligned with the axis A. The fiber 24 should be advanced through the channel 6 until the terminated surface 26 thereof abuts the stopping studs 10 at the second end 9 of the channel 6. Finally, the epoxy adhesive 32 is applied to the optical fiber 24 between the glass cover 34 and the distal end 7 of the channel 6 to secure the fiber 24 therein.

Figure 18:
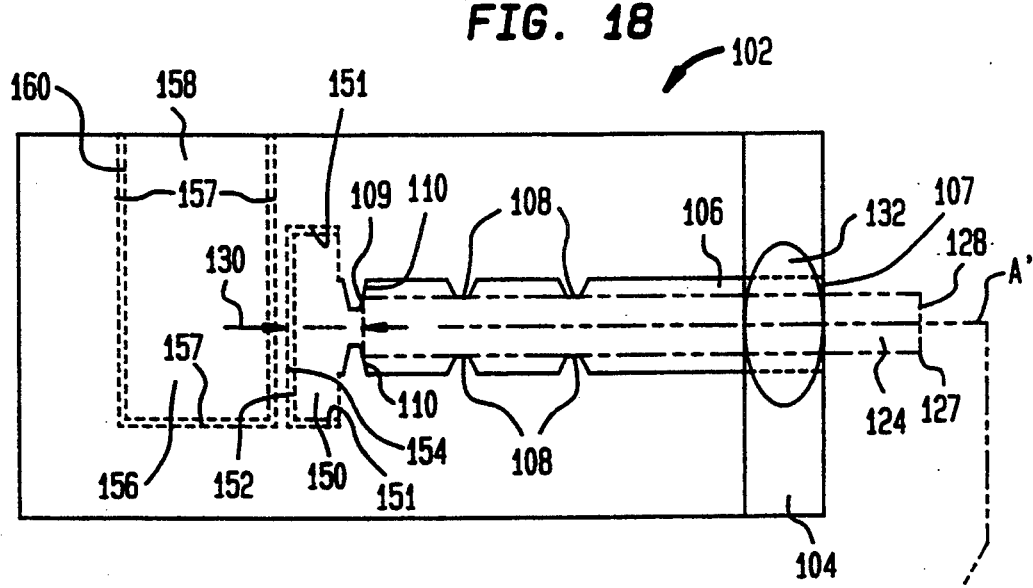
FIG. 18 is a top plan view of an interferometric fiber optic thermal sensor in accordance with a preferred embodiment of the present invention.
Figure 19:
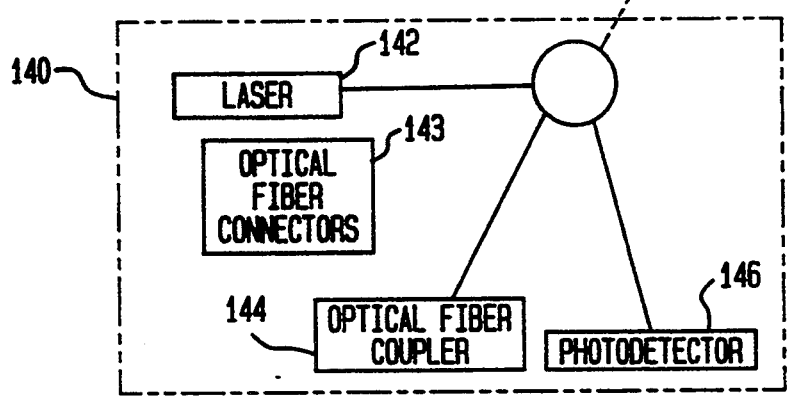
FIG. 19 is a side, cross-sectional view of the thermal sensor shown in FIG. 18.
Figure 19:
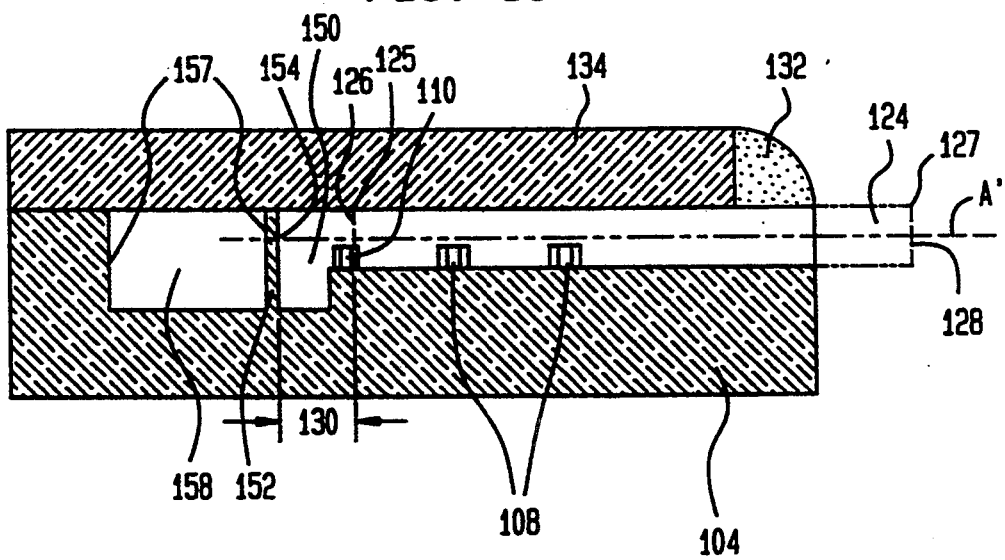

In another preferred embodiment of the present invention, a fiber optic interferometric thermal sensor, generally designated 102 in FIGS. 18 and 19 is provided. The thermal sensor 102 has a similar structure to the accelerometer 2 which has been described in detail hereinabove and therefore, the common features between the thermal sensor 102 and the accelerometer 2 will not be discussed in detail herein.

As best shown in FIG. 18, the thermal sensor 102 includes a first cavity 150 arranged proximally adjacent to stopping studs 110 at a second end 109 of a channel 106. The first cavity 150 includes a pair of side walls 151, top and bottom walls (not shown) and a deflectable proximal wall 152. A reflective surface 154 is transposed onto the deflectable proximal wall 152 and is adapted to deflect along the axis A', shown in phantom through the center of the channel 106. Additionally, the deflectable wall 152 is arranged so that its maximum deflection region is positioned along the axis A'.

A second cavity 156 is arranged adjacent the deflectable wall 152 and is proximal thereto as shown in FIGS. 18 and 19. The cavity 156 includes a plurality of sidewalls 157 and top and bottom walls (not shown). Preferably, each of the foregoing walls are coated with a corrosion resistant layer 160 to prevent deterioration of the silicon walls of the substrate 104; thus, prolonging the expected life span of the thermal sensor 102. The cavity 156 is arranged to fluidly communicate with a lateral channel 158, which extends through a side wall in the silicon substrate 104.

The thermal sensor 102 also includes a top glass cover 134 which is anodically bonded to the unitary silicon substrate 104 so as to create a hermetic seal therebetween. Finally, an adhesive 132 is used to secure the optical fiber 124 at a location adjacent the first end 107 of a channel 106. As will be discussed in more detail below, a hermetic seal is formed between the adhesive 132, the glass cover 134 and the silicon substrate 104 so that a thermal expansion fluid F is sealed therein.

In operation, the thermal sensor 102 is initially placed in an environment having a previously unknown temperature. A fluid from the ambient environment is permitted to enter the cavity 156 via a lateral channel 158. The thermal expansion fluid F within the cavity 150 is caused to expand or contract as a result of the temperature of the fluid from the ambient environment. In response to the expansion or contraction of the thermal expansion fluid F, the deflectable proximal wall 152 and thus, the reflective surface 154, is caused to deflect along the axis A'. As with the accelerometer 2, described hereinabove, the thermal sensor 102 includes a gap 130 defining a predetermined distance between the terminated surface 126 of an optical fiber 124 and the reflective surface 154. The gap 130 between the cavities 150 and 156 represents a zero reference point, for purposes of temperature measurement. Additionally, the zero reference point is maintained, in part, by the relationship between the optical fiber 124, which is fixed within the channel 106, and the stopping studs 110, which are arranged to prevent the terminated surface 126 from extending proximally into the cavity 150. It should thus be appreciated that any movement of the reflective surface 154 will cause a change in the phase shift of the light waves measured by an interferometric optical system 140. The thermal sensor 102 communicates with an interferometric optical system 140 which comprises a laser module 142, three single-mode optical fiber connectors 143, a four-port single-mode optical fiber coupler 144, and a photodiode module 146. When the thermal sensor 102 is in use, a light beam from the laser module 142 is transmitted into the second end 128 of the optical fiber 124. The laser module 142 is preferably driven by square wave pulses at a low duty cycle. The transmitted light beam travels largely unobstructed through the entire length of the optical fiber 124 until it reaches the terminated surface 126 thereof. A portion of the light beam is then reflected by the terminated surface 126 itself and is thus transmitted back toward the interferometric optical system 140. Another portion of the originally transmitted light beam extends beyond the terminated surface 126 until it encounters the deflectable reflective surface 154 at which point the reflected light beam is transmitted back through the optical fiber 124 and into the interferometric system 140. Both of the reflected light beams are detected by the photodetector module 146 which calculates the phase difference therebetween and can thus determine the degree which the thermal expansion of fluid F has caused the deflectable reflective surface 152 to move. Accordingly, the thermal sensor 152 can be used to accurately determine the temperature within a given environment.

The intensity distribution in the interferometric optical system 140 is produced by superimposing the two reflected light beams and is represented by the equation $I = I_o + I_r + 2(I_o I_r)^{.5} \cos(\text{theta} + \text{phi})$, where $I_o$ and $I_r$ represent the intensities of the reflected light beams from the reflective surface 152 and the terminated surface 126 of the optical fiber 124, respectively. Theta represents the fixed phase difference with respect to the two reflected light beams, and phi represents the additional phase difference induced by the expansion of the fluid within the sealed cavity 150.

Figure 20:
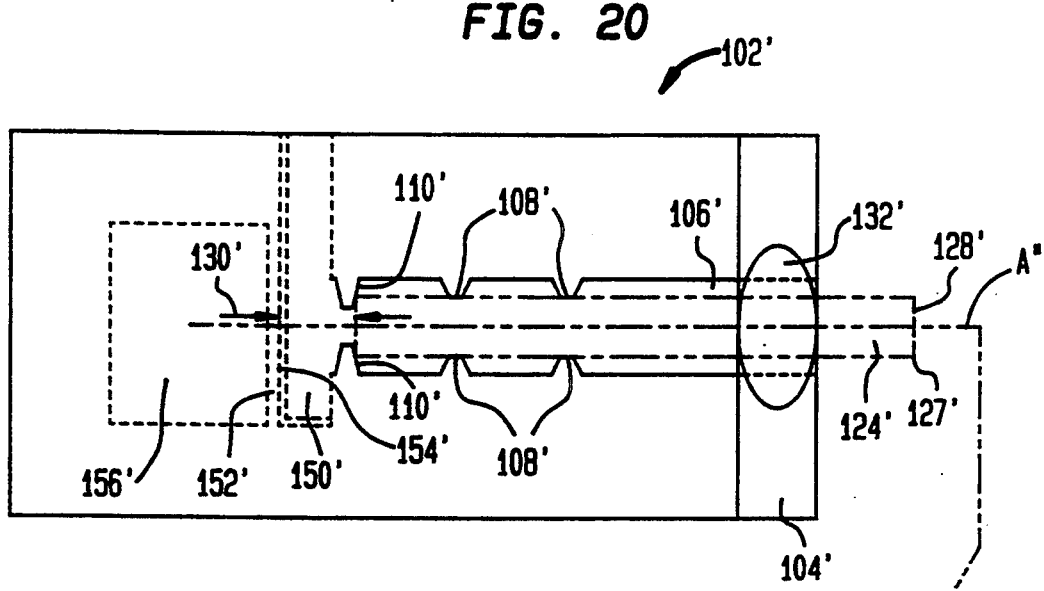
FIG. 20 is a top plan view of an interferometric fiber optic thermal sensor in accordance with a second preferred embodiment of the present invention.

A second embodiment of a preferred thermal sensor 102' is disclosed in FIG. 20. The structure and operation of the thermal sensor 102' is substantially the same as the structure in operation of the thermal sensor 102, described above, with some minor alterations thereto. In particular, the first cavity arranged proximally adjacent the stopping studs 110' is not sealed as in the first environment, but, instead, includes a lateral channel 158' which is open for communication with an ambient environment. Additionally, the inner walls of the cavity 150' are coated with a corrosion resistant layer 160', as are the walls of the second cavity 156 of the thermal sensor 102 described above. The second cavity 156' of the thermal sensor 102' is sealed beneath the top glass cover plate 134' as best appreciated with reference to FIG. 20. Optionally, the optical fiber guide channel 106' of the thermal sensor 102' can be sealed by applying a sealant at both ends thereof. As in the previous embodiment, the deflectable reflective surface 154' has its maximum path of expansion along the axis A" through the channel 106'.

Figure 21:
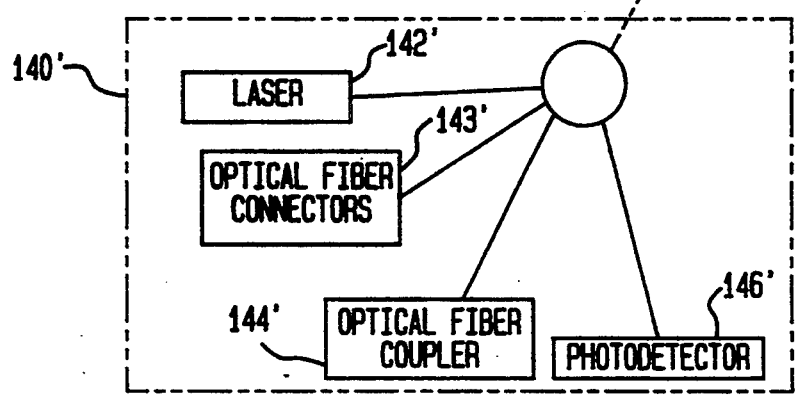
FIG. 21 is a side, cross-sectional view of the thermal sensor shown in FIG. 20 illustrating an additional component not present in the additional preferred embodiments of the thermal sensor.
Figure 21:
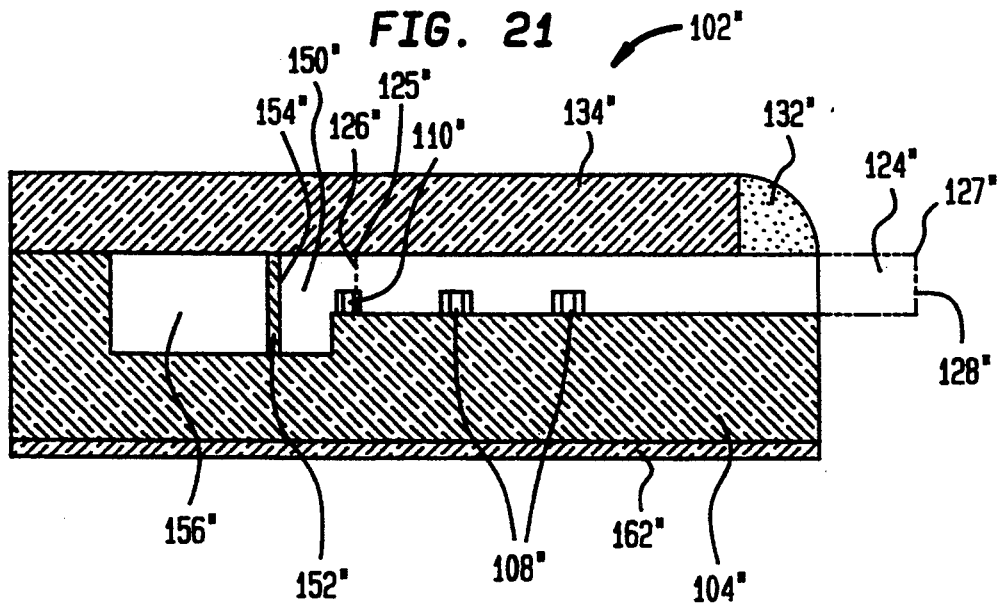

In a third preferred embodiment of the thermal sensor of the present invention (FIG. 21), a thermal sensor 102" is provided. The structure and operation of thermal sensor 102" is substantially identical to the structure and operation of the thermal sensor 102'. The only difference being the addition of an infrared absorbing layer, such as a 3 $\mu$m thick layer of black bismuth 162" which is arranged on the bottom side of the silicon substrate 104" in place of a glass cover. As in the embodiment of the thermal sensor 102', thermal expansion fluid F of the thermal sensor 102" is sealed within the second cavity 156". Preferably, the thermal expansion fluid is a gas. However, the thermal expansion fluid may also comprise a liquid as will be discussed in more detail below.

Figure 22:
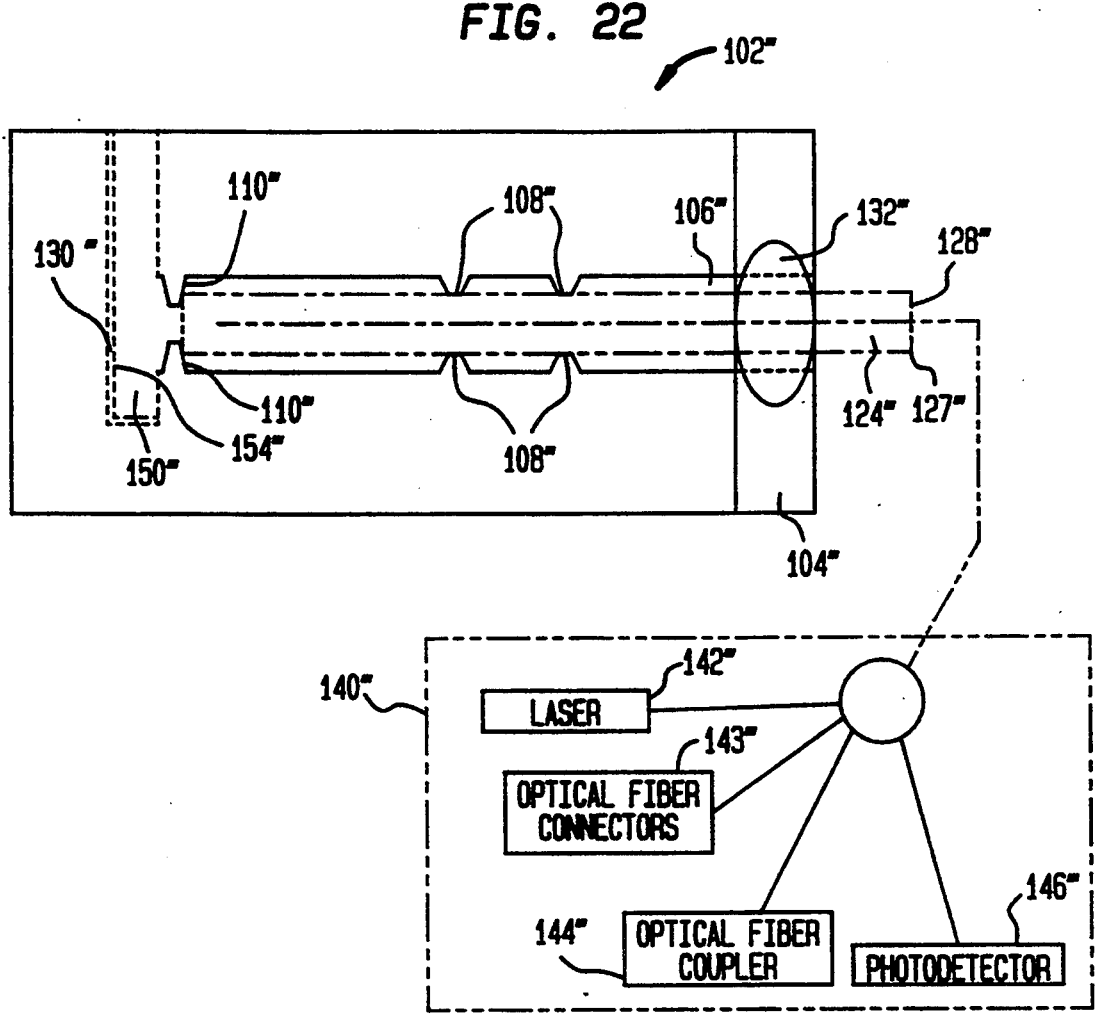
FIG. 22 is a top plan view of an interferometric fiber optic thermal sensor in accordance with a fourth preferred embodiment of the present invention.

According to a fourth embodiment of the thermal sensor 102''' (FIG. 22), the second cavity is eliminated and only one cavity, the first cavity 150''' exists. In this regard, cavity 150''' is arranged proximally adjacent to the stopping studs 110''' at the second end 109''' of the channel 106'''. The walls of the first cavity 150''' are coated with a corrosion resistant layer 160''' as they are exposed to the ambient environment through lateral channel 158'''. The proximal most wall of the cavity 150''' includes a reflective surface 154'''. However, in this preferred embodiment, the reflective surface 154''' is not deflectable. Instead, it is the optical fiber 124''', itself, that is free to move to and fro along the axis A''' of the channel 106'''. Proximal movement of the terminated surface 126''' of the optical fiber 124''' is again limited by the position of the stopping studs 110'''.

More particularly, the thermal sensor 102''' takes advantage of the different thermal expansion coefficients between the silicon substrate 104''' and the optical fiber 124'''. The thermal expansion coefficient of silicon ($2.33 \times 10^{-6}/°$ C.) is much higher than the thermal expansion coefficient of the optical fiber ($0.55 \times 10^{6}/°$ C.), which may comprise silicon dioxide. As the temperature of the thermal sensor 102''' increases, the free part of the optical fiber 124''', i.e., that portion of the fiber which extends from the terminated surface 126''' to the adhesive 132''', expands less than the adjacent portion of the silicon substrate 104''', i.e., the channel 106'''. Thus, the terminated surface 126''' will move away from the reflective surface 154''' causing the size of the gap 130''' to increase.

In a method of for manufacturing a thermal sensor, such as thermal sensor 102 in accordance with the present invention, a unitary silicon substrate 104 is initially provided. Preferably, the substrate 104 is oriented within 1° of the <110> axis and includes a flat portion arranged parallel to one of the two sets of {1,1,1} planes which intersect the <1,1,0> surface. The method of fabricating various embodiments of the thermal sensor 102, 102',102", 102''' is essentially the same as the method for manufacturing the acceleration sensor 2 discussed above.

In performing the anisotropic etching steps required for fabricating of the various sensors of the present invention, it should be understood that dimensional control is obtained by maintaining a set of sides of the rectangular trenches (such as trenches 90, 92, 94, 96 and 98 of FIG. 9) as flat as possible, i.e., aligned with the <1,1,0> direction, within 1° of accuracy. Such alignment can be accomplished in one of two ways. The first way utilizes a conventional method by placing marks on the photoresist masks, which coincide with the "flat" part of the wafer. The second way utilizes a method in which a row of rectangular trenches are etched approximately 10 $\mu$m deep into the substrate parallel with the wafer "flat."

Figure 23:
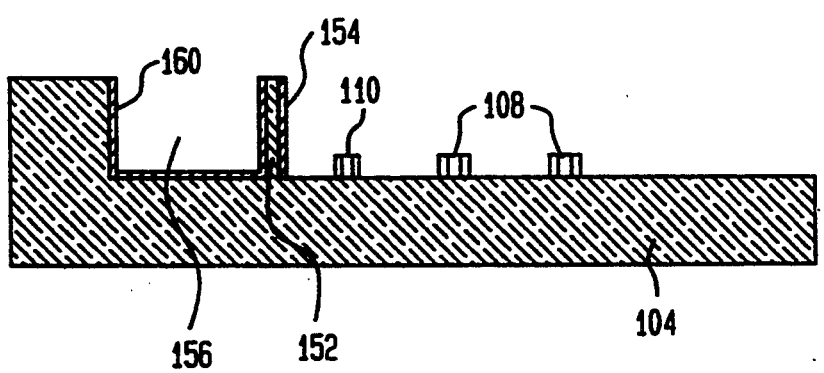
FIG. 23 is a side, cross-sectional view illustrating one step in the method of manufacturing a fiber optic interferometric thermal sensor in accordance with the present invention.

The oxidizing and anisotropic etching steps used to fabricate the sensors of FIGS. 18 to 22 are similar to those used in connection with the manufacture of the acceleration sensor. The particular patterns used in the method steps are varied so as to form the necessary cavities and the deflective wall therebetween, rather than the movable mass 18 and beams 20 used in the acceleration sensor. Moreover, those sensors which include portions exposed to the environment outside the sensor are subjected to additional steps to form corrosive-resistant layers. Thus, as shown in FIG. 23, the silicon substrate 104 is thermally oxidized until a 1000 angstrom thick oxide layer is formed on the side walls of the cavity 156 and on the area which is to form the deflectable distal-most wall 152 of cavity 150. At this point, it is preferable to form a 1200 angstrom thick silicon nitride layer on the surface of the 1000 angstrom thick oxide layer by utilizing chemical vapor deposition techniques. A 400 angstrom thick titanium layer and a 1500 angstrom thick gold layer are then similarly deposited over the silicon nitride layer by chemical vapor deposition. The resultant composite layer comprises a corrosion resistant layer 160 which is used to protect the internal walls of the cavity 156 and the deflectable wall 152 of the cavity 150.

As with the steps of manufacturing the acceleration sensor 2, the steps of manufacturing the various embodiments of the present thermal sensor, include the steps of dicing the substrate 104 into individual chips and then anodically bonding a glass cover to the top surface thereof. Additionally, the present method of manufacturing the thermal sensor includes the step of inserting a single-mode optical fiber 124 into a sized and shaped channel 106 until the terminated surface 126 of the fiber 124 abuts the stopping studs 110, and the positioning studs 108 abut a portion of the perimeter of the fiber 124 so that the fiber is centrally located on the axis A'. In order to properly secure the fiber 124 within the channel 106, a small piece of copolymer 132 is placed adjacent the optical fiber 124 at the first end 107 of the channel 106. The copolymer 132 is then subjected to a heat source of about 482° C. for approximately 30 minutes. This application of heat is sufficient to melt the copolymer 132 until it flows around the optical fiber 124 thereby sealing preselected gases within the channel 106 and the cavity 150 and permanently securing the optical fiber 124 to the substrate 104.

It should be appreciated that the steps of the methods for manufacturing the various embodiments of the present thermal sensors 102, 102', 102" and 102'" will be slightly modified depending on the required thermal sensing elements. However, by and large, the steps of manufacturing the various embodiments of the thermal sensors are quite similar. As the present thermal sensors 102-102" require sealing at least one cavity, it should be understood that the step of sealing the required cavities, is performed at a temperature of between about 300°–400° C. when the thermal expansion fluid F is gas. On the other hand, when the thermal expansion fluid F is a liquid, the sealing step may be carried out at room temperature to avoid evaporation of the fluid F, which may occur at elevated temperatures.

In another aspect of the present invention, a fiber optic interferometric pressure sensor 202 is provided. As with the acceleration sensor and the thermal sensor discussed above, the apparatus and the method of manufacturing same use a unitary silicon substrate 204. Since the structure of the pressure sensor 202 is similar to the structure of the accelerometer 2 and the various embodiments of the thermal sensor 102-102'", the common features will be incorporated by reference and will not be discussed in detail herein.

A first embodiment of the pressure sensor 202 of the present invention is shown in FIGS. 24 and 25. In this embodiment, the pressure sensor 202 includes a first cavity 250 arranged proximally adjacent the fiber optic stops 210. The first cavity 250 includes a plurality of internal walls including a deflectable distal-most wall 252 on which a reflective surface 254 is formed. The reflective surface 254 defines a plane perpendicular to an axis AA which extends through the center of a channel 206. The first cavity 250 includes a side channel 258 arranged to extend through the edge of the substrate 204 to communicate with a first ambient environment having a first pressure. A second cavity 256 is arranged proximal to the first cavity 250 and is adjacent the deflectable wall 252. A through hole 260 extends between the second cavity 256 and a second ambient environment having a second pressure. A silicon plate, or alternatively a glass plate, 234 is anodically bonded to the top surface of the silicon substrate 204. A gold layer 266, approximately 4000 angstroms thick, is arranged on the bottom surface of the silicon substrate 204. As best shown in FIG. 25, a gold plated support 264 is arranged beneath the gold layer 266. A lower port 268 defines a passageway through the gold plated support 264 and is aligned with the through hole 260 to permit fluid communication between a second ambient environment, of which pressure is to be determined, and the second cavity 256.

Finally, a cap 270 is arranged on the gold plated support 264 above the silicon substrate 204. The cap 270 includes an upper port 272 which permits the ambient pressure in the first ambient environment to fluidly communicate with the cavity 250.

In operation, the pressure sensor 202 is used to determine the difference between the first pressure and the second pressure by an optical phase shift induced by deflection of the wall 252. The deflection of the wall 252 is directly related to the pressure difference. The phase shift measurements are determined by the interferometric system 240 and operates substantially in accordance with the optical measuring features discussed above for the accelerometer 2 and various embodiments of the thermal sensors 102-102'".

The second cavity 256 serves as a reference cavity and fluidly communicates with a known ambient pressure via through-hole 260 and the aligned lower port 268. On the other hand, the first cavity 250 fluidly communicates with a first ambient pressure to be measured via through hole 258. The deflectable proximal wall 252 and the reflective surface 254 thereon is thus maximally deflected along the axis AA based on the pressure differential between the pressure from the first ambient to be measured and the known ambient pressure within the second cavity 256.

The second preferred embodiment of the present pressure sensor is denoted by reference numeral 202' and is shown in FIGS. 26 and 27. The structure of pressure sensor 202' differs from the structure of pressure sensor 202 in that the second cavity 256' is maintained at substantially zero pressure as it encloses a vacuum. A passageway 274' extends between the second cavity 256' and an aluminum deposition layer 276' as best shown in FIG. 27. The passageway 274' extends between the vacuumized second cavity 256' and a through-hole 260', Thus, the pressure sensor 202' differs from the pressure sensor 202 in that the known reference pressure in second cavities of 256 and 256', respectively is represented by a known positive pressure in second cavity 256 and zero pressure in second cavity 256'. The vacuum within the cavity 256' may be achieved by aluminum deposition sealing. During the process for depositing an aluminum layer 276', the cavity 256' is vacuumized and then sealed by the deposited aluminum layer.

A third embodiment of the present pressure sensor denoted by reference numeral 202" is illustrated in FIGS. 28 and 29. As with the previous embodiment, the reference pressure in the second cavity 256" is maintained at zero within a vacuum. The distinction between the third embodiment of the pressure sensor 202" and the second embodiment of the pressure sensor 202' is that the pressure sensor 202" includes trapezoidal shaped through hole 278" within the (1,0,0) silicon wafer bonded to the unitary silicon substrate 204". A 3 μm thick aluminum layer 276" is placed over the entrance to the through-hole 278" thereby sealing the vacuumized environment within the second cavity 256". The aluminum layer 276" may be formed by evaporation or sputtering. Both the evaporation and the sputtering may be performed in a high vacuum system.

In a method for manufacturing various embodiments of the fiber optic interferometric pressure sensors 202-202", the starting point includes providing a {1,1,0} silicon substrate as discussed above in the methods of manufacturing the accelerometer and the various embodiments of the thermal sensors. The distinguishing features from the above methods pertain to the formation of the distinctive sized and shaped passageways and through holes required in the various embodiments of the pressure sensors 202-202" and the formation of vacuum chambers in the second cavities 256' and 256". Further distinctive steps include the formation of a 4000 angstrom thick gold layer by conventional evaporation processes on the bottom surface of the silicon substrate 204, and the step of thermally bonding the gold plated support 264 to the gold layer 266 so that the through-hole 260 adjacent the cavity 256 is aligned with the lower port 268 of the gold plated support 264. Additional distinctive steps of the method of manufacturing the pressure sensor 202 include the step of attaching the cap 270 and the upper port 272 to the support 264.

While the foregoing description and figures are directed toward the preferred embodiments in accordance with the present invention, it should be appreciated that numerous modifications can be made to each of the components of the various fiber optic interferometric sensors and the steps in the methods of manufacturing same. Indeed, such modifications are encouraged to be made in the materials, structure, arrangement and steps of the disclosed embodiments of the present invention without departing from the spirit and scope of same. Thus, the foregoing description of the preferred embodiments should be taken by way of illustration rather than by way of limitation with respect to the present invention as defined by the claims set forth below.

I claim

1. A fiber optic interferometric sensor comprising:
   a unitary integral substrate having a channel therein, said channel having an axis, said unitary integral substrate also including a reflective surface defining a plane perpendicular to said axis;
   an optical fiber for conducting a light beam therethrough, said optical fiber having a terminated surface, said fiber extending axially within said channel, said terminated surface and said reflective surface being movable relative to one another in response to a phenomenon to be sensed, each of said terminated surface and said reflective surface being adapted to reflect a portion of said light beam so that light reflected from said terminated surface and said reflected surface is reconducted through said optical fiber; and
   positioning means integral with said unitary integral substrate for positioning said optical fiber in said channel.

2. The sensor of claim 1 further comprising stop means integral with said substrate arranged adjacent said terminated surface of said optical fiber for retaining a minimum predetermined distance between said terminated surface and said reflective surface.

3. The sensor of claim 1 further comprising securing means for securing said optical fiber to said substrate.

4. The sensor of claim 1 wherein said reflective surface is movable axially with respect to said channel, and said terminated surface of said optical fiber is fixed against axial movement relative to said channel.

5. The sensor of claim 1 wherein said reflective surface is fixed against axial movement relative to said channel, and said terminated surface of said optical fiber is axially movable relative to said channel.

6. The sensor of claim 1 wherein said positioning means comprises a plurality of positioning studs, at least two of said positioning studs arranged on opposite sides of said channel and defining a passageway therebetween, said passageway being coaxial with said axis of said channel and having a predetermined width so that said optical fiber can precisely fit between said oppositely arranged positioning studs.

7. The sensor of claim 2 wherein said channel includes a retaining end, said stop means comprising at least one stopping stud abutting said terminated surface of said optical fiber adjacent said retaining end to thereby arrest movement of said terminated surface relative to said at least one stopping studs, said reflective surface being axially movable relative to said at least one stopping stud and said channel.

8. The sensor of claim 1 wherein said substrate includes at least one flexible portion, said substrate further comprising a sensing mass integral therewith and connected to said at least one flexible portion, said sensing mass being movable relative to said terminated surface of said optical fiber, said reflective surface being formed on said sensing mass.

9. The sensor of claim 8 wherein said substrate comprises a plurality of inner walls defining a recess, said sensing mass being suspended in said recess.

10. The sensor of claim 9 further comprising a cover mounted on said substrate so that said channel and said recess are enclosed between said cover and said substrate.

11. The sensor of claim 9 wherein said at least one flexible portion comprises a plurality of movable beams integral with said substrate, said beams having a first end connected to one of said inner walls and a second end connected to said sensing mass for supporting said sensing mass in said recess.

12. The sensor of claim 11 further comprising a frame integral with said substrate, said frame including said plurality of inner walls of said substrate and being arranged to surround said beams and said mass to prevent said mass from moving beyond a predetermined location.

13. The sensor of claim 1 wherein said substrate further comprises a first plurality of inner walls defining a first cavity therein, said first cavity being sealed and arranged to retain a fluid therein, said reflective surface arranged on one of said inner walls and being deflectable in response to expansion and contraction of said fluid therein upon respective heating and cooling of said fluid, said reflective surface being axially movable with respect to said channel, and said terminated surface of said optical fiber being fixed against axial movement relative to said channel.

14. The sensor of claim 13 wherein said positioning means comprises a plurality of positioning studs, at least two of said positioning studs arranged on opposite sides of said channel and defining a passageway therebetween, said passageway being coaxial with said axis of said channel and having a predetermined width so that said optical fiber can precisely fit between said oppositely arranged positioning studs.

15. The sensor of claim 14 wherein said channel includes a retaining end, said substrate comprising at least one stopping stud abutting said terminated surface of said optical fiber adjacent said retaining end so that said terminated surface is prevented from moving axially beyond said retaining end.

16. The sensor of claim 15 wherein said substrate further comprises a second plurality of inner walls defining a second cavity therein, said second cavity arranged adjacent said first cavity and having an end open to an area outside of said substrate.

17. The sensor of claim 1 wherein said substrate further comprises a plurality of inner walls defining a cavity therein, said cavity connected to said channel, and said reflective surface being arranged on one of said inner walls of said cavity so that light can freely travel between said terminated surface of said optical fiber and said reflective surface.

18. The sensor of claim 17 wherein said reflective surface is fixed against axial movement relative to said channel, and said terminated surface of said optical fiber is axially movable relative to said channel.

19. The sensor of claim 13 further comprising heat absorbing means connected to said substrate for absorbing heat and transferring same to said fluid.

20. The sensor of claim 19 wherein said heat absorbing means includes an infrared absorbent material.

21. The sensor of claim 13 further comprising a cover mounted on said substrate so that said channel and said first cavity are enclosed between said cover and said substrate.

22. The sensor of claim 17 further comprising a cover mounted on said substrate so that said channel and said cavity are enclosed between said cover and said substrate.

23. The sensor of claim 1 wherein said substrate includes pressure sensing means arranged in said substrate for detecting a pressure differential between a controlled environment and an ambient environment.

24. The sensor of claim 23 wherein said pressure sensing means comprises a deflectable diaphragm integral with said substrate, said reflective surface being arranged on said deflectable diaphragm.

25. The sensor of claim 24 wherein said pressure sensing means further comprises a first plurality of internal walls defining a first cavity and a second plurality of internal walls defining a second cavity, said diaphragm being arranged between said first and second cavities for deflectable movement along said axis of said channel.

26. The sensor of claim 25 wherein said first cavity is sealed and defines a controlled environment therein, said second cavity being arranged adjacent said first cavity and having an end opened to an area outside of said substrate in communication with an ambient environment.

27. The sensor of claim 6 wherein said substrate comprises a (1,1,0) silicon wafer.

28. The sensor of claim 11 wherein said substrate comprises a (1,1,0) silicon wafer.

29. The sensor of claim 14 wherein said substrate comprises a (1,1,0) silicon wafer.

30. The sensor of claim 23 wherein said substrate comprises a (1,1,0) silicon wafer.

31. A fiber optic interferometric sensing system comprising:
a unitary integral substrate having a channel therein, said channel having an axis therethrough said unitary integral substrate also including a reflective surface defining a plane perpendicular to said axis;
an optical fiber for conducting a light beam therethrough, said optical fiber having a terminated surface and a second surface remote from said terminated surface, said fiber extending axially within said channel, said terminated surface and said reflective surface being movable relative to one another in response to a phenomenon to be sensed, each of said terminated surface and said reflective surface being adapted to reflect at least a portion of said light beam so that light reflected from said terminated surface and said reflective surface is reconducted through said optical fiber;
positioning means integral with said substrate for positioning said optical fiber in said channel;
a light source in communication with said second surface of said optical fiber for providing said light beam thereto, said optical fiber adapted to transport said light beam to said reflective surface and being further adapted to receive reflected light waves from said reflective surface and said terminated surface thereof and to reconduct said reflected light waves therethrough; and
optical circuit means for measuring a phase shift in said light waves provided to said reflective surface dependent on said relative movement between said reflective surface and said terminated surface of said optical fiber.

32. A method of manufacturing a fiber optic interferometric sensor comprising the steps of:
providing a unitary integral substrate;
forming a channel in said unitary integral substrate, said channel having an axis therethrough;
forming a reflective surface integral with said substrate perpendicular to said axis of said channel; and
inserting an optical fiber having a terminated surface thereon in said channel.

33. The method of claim 32, further comprising the steps of forming at least one positioning stud in said channel, said positioning stud being integral with said substrate; and arranging said at least one positioning stud in said channel so that said optical fiber is secured therein.

34. The method of claim 33 wherein said at least one positioning stud comprises a plurality of positioning studs, said method comprising the further step of arranging at least two of said plurality of positioning studs on opposite sides of said channel so that a passageway is formed therebetween, said passageway being coaxial with said axis of said channel.

35. The method of claim 32, wherein said step of providing a substrate comprises the step of providing a (1,1,0) silicon wafer.

36. The method of claim 32, wherein said channel and said reflective surface are formed by anisotropically etching said substrate.

37. The method of claim 36, wherein said channel includes a retaining end, said method comprising the further step of forming at least one stopping studs abutting said terminated surface of said optical fiber adjacent said retaining end so that said terminated surface is prevented from moving axially passed said retaining end.

38. The method of claim 37, further comprising the step of providing a cover on said substrate above said reflective surface and said channel.

39. A method of manufacturing a fiber optic interferometric sensor comprising the steps of providing a unitary integral substrate; forming an etch mask layer on said unitary integral substrate; forming a channel in said unitary integral substrate, said channel having an axis therethrough; forming a plurality of positioning studs in said channel, said positioning studs being integral with said substrate; arranging at least two of said positioning studs on opposite sides of said channel so that a passageway is formed therebetween, said passageway being coaxial with said axis of said channel; inserting an optical fiber having a terminated surface thereon between said positioning studs in said channel; and forming a reflective surface integral with said substrate perpendicular to said axis of said channel, said reflective surface and said terminated surface of said optical fiber being arranged for relative movement therebetween along said axis of said channel.

40. The method of claim 39, further comprising the step of anisotropically etching said substrate to form said channel, said positioning studs and said reflective surface.

41. The method of claim 40, wherein said channel comprises a retaining end, said method comprising the further step of subjecting said substrate to anisotropic etching to form at least one stopping stud integral therewith adjacent said retaining end of said channel and abutting said terminated end of said optical fiber.

42. The method of claim 41, further comprising the steps of forming a recess in said substrate adjacent said at least one stopping stud; forming a movable mass integral with said substrate by anisotropic etching and positioning said mass in said recess; forming a plurality of movable beams integral with said substrate by anisotropic etching, said plurality of movable beams having a first end connected to an inner wall in said substrate and a second end connected to said mass for supporting said mass in said recess; and arranging said reflective surface on said mass.

43. The method of claim 40 further comprising the steps of forming a first plurality of internal walls defining a first cavity, forming a second plurality of internal walls defining a second cavity, forming a diaphragm arranged between said first and second cavities for deflectable movement along said axis of said channel and said substrate, and arranging said reflective surface on said deflectable diaphragm.

44. The method of claim 43, wherein an anisotropic etching process is used to form said first cavity, said second cavity and said deflectable diaphragm.

45. The method of claim 44 further comprising the steps of sealing said first cavity and providing a controlled environment therein, arranging said second cavity adjacent said first cavity and providing a passageway from said second cavity to an area outside of said substrate to permit an ambient environment to be retained therein.

* * * * *

UNITED STATES PATENT AND TRADEMARK OFFICE
CERTIFICATE OF CORRECTION

PATENT NO. : 5,381,231
DATED : January 10, 1995
INVENTOR(S) : Tu

It is certified that error appears in the above-indentified patent and that said Letters Patent is hereby corrected as shown below:

Column 6, line 26, "With" should read --with--.
Column 7, line 38, "be" should read --18--.
Column 7, line 46, "be" should read --18--.
Column 9, line 31, "be" should read --18--.
Column 11, line 24, "9d" should read --91d--.
Column 11, line 25, "9d" should read --91d--.
Column 11, line 33, "9d" should read --91d--.
Column 14, line 17, "$10^6$" should read --$10^{-6}$--.

Signed and Sealed this

Twenty-fifth Day of April, 1995

Attest:

BRUCE LEHMAN

Attesting Officer    Commissioner of Patents and Trademarks